United States Patent [19]

Hunter

[11] 3,803,562

[45] Apr. 9, 1974

[54] SEMICONDUCTOR MASS MEMORY

[75] Inventor: John C. Hunter, Phoenix, Ariz.

[73] Assignee: Honeywell Information Systems Inc., Waltham, Mass.

[22] Filed: Nov. 21, 1972

[21] Appl. No.: 307,317

[52] U.S. Cl. ... 340/173 R, 340/172.5, 340/173 AM

[51] Int. Cl. ........................ G11c 13/00, G11c 15/00

[58] Field of Search ...... 340/172.5, 173 R, 173 AM

[56] References Cited

UNITED STATES PATENTS 3,576,436 4/1971 Linquist ........................ 340/173 AM

*Primary Examiner*—Terrell W. Fears

*Attorney, Agent, or Firm*—Edward A. Gerlaugh

[57] ABSTRACT

A block-addressable mass memory subsystem comprising wafer-size modules of LSI semiconductor basic circuits is disclosed. The basic circuits are intrinsically addressable and interconnected on the wafer by non-unique wiring bus portions formed in a universal pattern as part of each basic circuit. A disconnect circuit isolates defective basic circuits from the bus.

8 Claims, 31 Drawing Figures

MASK 1

MASK 2

MASK 3

MASK 4

MASK 5

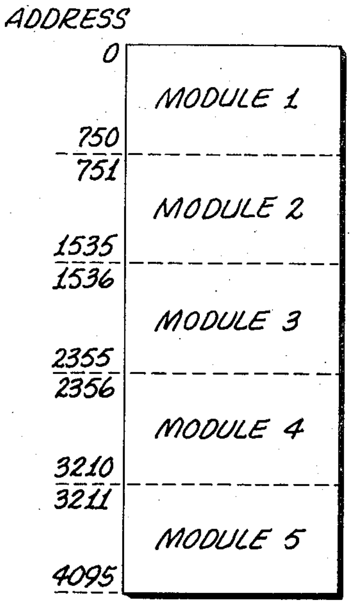
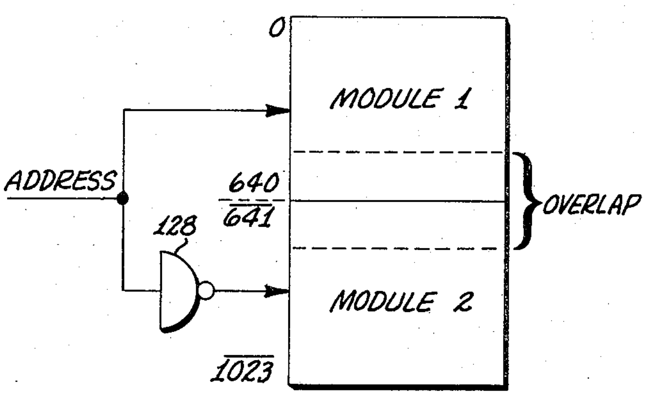
FIG. 21
FIG. 20
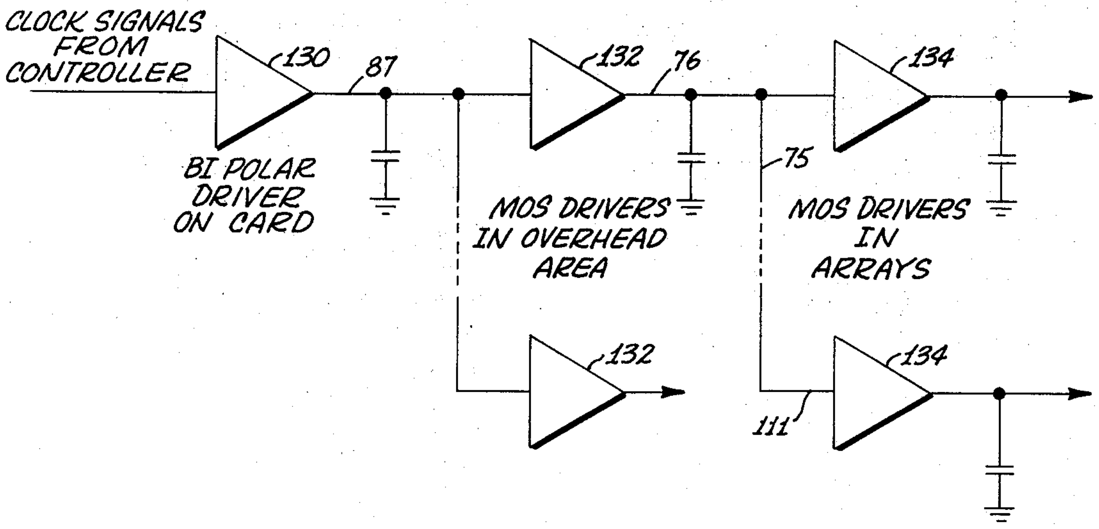
FIG. 22

SEMICONDUCTOR MASS MEMORY

BACKGROUND OF THE INVENTION

The invention relates generally to a memory subsystem for a data processing system, and more particularly, to a block-addressable random access store in which all of the active memory elements are comprised of conductor-insulator-semiconductor (CIS) devices formed as integrated circuits on a common substrate which may be, for example, silicon.

The memory subsystem of a data processing system is considered a hierarchy of store unit types in an order ascending in storage capacity and descending in the cost per unit of storage and the accessibility of the data stored. At the base of the mountain of data in the memory hierarchy is a mass of stored information available for use by the data processor, not immediately upon call, but only after a relatively long latent period or latency during which period the desired data is located, and its transfer to the data processer is commenced. Examples of media utilized by mass storage units are magnetic tape, punched paper tape and cards, and magnetic cards. Although the cost per unit of storage is extremely low, mass storage devices employing such media must physically move the media, consequently, they exhibit extremely long latencies.

Instantly visible at the summit of the memory hierarchy is a small, extremely fast working store capable of storing only a limited amount of often used data. Such ultra-fast stores, termed cache or scratchpad memories, are limited in size by their high cost. Intermediate the cache and mass stores in the memory hierarchy are the main memory and the bulk memories. The main memory holds data having a high use factor, and consequently, comprises relatively high speed elements such as magnetic cores or semiconductor devices. The cost per unit of storage for main memory is generally high but not so high as the cache memory.

Data processing systems requiring large storage capacities may employ bulk memory comprising additional high speed magnetic core or semiconduuctor memory. However, the high speed bulk memory is often prohibitively expensive, and slower, less expensive magnetic disc or drum devices, as for example, the type having a read/write head for each track of data on the surface of the device, are utilized. The tradeoff is characterized by extremely short, vitually zero latency (e.g., 500ns or less) and high cost giving way to long latency (10μs) and lower cost. Still less expensive bulk memory devices having even longer latency may be utilized, e.g., magnetic discs or drums having movable heads, the so-called head per surface devices.

In the prior art bulk memories, the advantages of larger storage capacities and lower cost per unit of storage are attended by the disadvantage of longer latency. The present invention contemplates a new type of memory unit for replacing devices in the memory hierachy between the cache store and the very low cost, high capacity, long latency mass storage devices.

The advantages of the present invention over the prior art are best realized in the environment of the modern large scale data processing system wherein the total storage capacity is divided into two functional entities, viz.: working store and auxiliary store. In earlier computer systems programs being executed were located in their entirety in the working store, even though large portions of each program were idle for lengthy periods of time, tying up vital working store space. In the more advanced systems, only the active portions of each program occupy working store, the remaining portions being stored automatically in auxiliary store devices, as for example, disc memory. In such advanced systems, working store space is automatically allocated by a management control subsystem to meet the changing demands of each program as it is executed. A management control subsystem is a means of dynamically managing a computer's working store so that a program, or more than one program in a multiprogramming environment, can be excuted by a computer even though the total program size exceeds the capacity of the working store.

Modern data processing systems thus are organized around a memory hierarchy having a working store with a relatively low capacity and a relatively high speed, operating in concert with auxiliary store having relatively great capacity and relatively low speed. The data processing systems are organized and managed so that the vast majority of accesses of memory storage areas, either to read or to write information, are from the working store so that the access time of the system is enhanced. In order to have the majority of accesses come from the relatively fast working store, blocks of information are exchanged between the working store and auxiliary store in accordance with a predetermined algorithm implemented with logic circuits. A "block" defines a fixed quantity of data otherwise defined by terms such as pages, segments, or data groups and which quantity is a combination of bits, bytes, characters, or words. A program or subroutine may be comprised of one or more data blocks. A data block may be at one physical storage location at one time and at another physical storage location at another time, consequently, data blocks are identified by symbolic or effective addresses which must be dynamically correlated, at any given time, with absolute or actual addresses identifying a particular physical memory and physical storage locations at which the data block is currently located. The speed of a data processing system is a function of the access time or thhe speed at which addressed data can be accessed which, in turn, is a function of the interaction between the several memories in the memory hierarchy as determined by the latency of the auxiliary store devices.

From a total system point of view, therefore, the most desirable characteristic of an auxiliary store is the ability to address a data block directly (i.e., absolute address) and have the block of data automatically moved to the working store, the latency determined only by the transfer rate of the exchange algorithm implemented in the central system. Ideally, the auxiliary store should be able to adjust its data transfer rate instantaneously to adapt to queueing delays at the working store processor interface, thus providing the fastest possible transfer rate while accounting for variable system loading on the working store. In view of the above background, the disadvantages of the prior art auxiliary stores having mechanically rotated magnetic storage media are apparent in that the prior art systems are characterized by relatively long latency and a fixed minimum transfer rate dictated by mechanical constraints.

Accordingly, it is desirable to provide a relatively inexpensive, variable record size, block-transfer auxiliary store for storing mass quantities of data, and connected for communication with the working store to supply programs and information to the working store as required for processing, and to provide temporary storage for processed data accepted from the working store, prior to transfer of the processed data to an output device, and yet to provide such interchange of data blocks with virtually zero latency.

Semiconductor large scale integration (LSI) inherently provides the design flexibility, reliability, size, and cost for implementing such an auxiliary store. In the prior art there are two basic approaches for fabricating LSI devices: one uses a technique commonly termed "discretionary wiring;" the other uses carefully controlled, improved yield and a custom interconnection pattern to form a single monolithic circuit. The latter approach produces a plurality of interconnected unique circuit elements on a common substrate by means of the known diffusion, masking, and vapor-deposition techniques. A complex monolithic circuit often with several thousand unique circuit elements is thus formed. A plurality of such large circuits can advantageously be accommodated on one semiconductor substrate and contact made to them. A disadvantage, however, is the low yield associated with the process because of the probability that one of the plurality of unique circuit elements comprising the monolithic circuit will be defective. If only one of the unique circuit elements is bad the entire monolithic array of circuits is useless and must be discarded.

The alternate techniques, discretionary wiring, interconnects groups of identical basic circuits with multilevel metallization to provide a number of complex functions on a single semiconductor slice. The technique is characterized by the fabrication on a semiconductor wafer of as many useful basic circuits as are needed for the construction of the larger circuits. The basic circuits are generally logical configurations, trigger stages and the like which are relatively simple circuits when compared with the monolithic circuits described above. The basic circuits are interconnected to form larger elements, as for example, shift registers, storage arrays, or an arithmetic unit. Each basic circuit is tested prior to interconnection and only the operable circuits are connected and used to form the final element. An automatic tester having a multipoint probe is controlled by a computer to test each of the basic circuits. The multipoint probe is moved or stepped sequentially to make contact with and test each of the basic circuits for predetermined circuit functions. The resulting test information is stored on magnetic tape for processing in a high speed computer. Subsequent to the testing, the computer generates discretionary interconnection pattern data from the stored test results, the data defining a pattern which connects only operative basic circuits and bypasses defective circuits on the wafer. The interconnection pattern data is then fed to an automatic mask generation system which photographically produces a unique discretionary mask. Utilizing the unique mask, leads are then etched to interconnect the operative basic circuits. While the discretionary wiring technique provides a very high level of circuit integration, the method is disadvantageous in that a separate mask is necessary for each wafer in order to establish the connections between the useful basic circuits. Each unique mask is useless after it has once been used.

SUMMARY OF THE INVENTION

Accordingly, it is desirable to provide a large scale integrated array comprising a plurality of relatively low-yield identical basic circuits, wherein the basic circuits are interconnected by a non-unique wiring arrangement.

Therefore, it is the principal object of this invention to provide an improved semiconductor memory subsystem for a data processing system.

Another object of the invention is to provide an improved virturally zero latency auxiliary store for a data processing system.

Another object of the invention is to provide in a data processing system an improved auxiliary store which serves to reduce the size and accordingly the cost of the working store.

Another object of the invention is to provide an improved auxiliary store comprised of semiconductor LSI circuits.

Another object of the invention is to provide a solid state storage subsystem for replacing storage devices having mechanically driven magnetic media.

Another object of the invention is to provide an improved storage subsytem for data processing system wherein the active elements are comprised of integrated circits fabricated on a substrate of semiconductor material, with packaging introduced at the wafer level.

Another object of the invention is to provide a low cost, virtually zero latency, variable record size, block transfer, auxiliary store connected for cummunication with the working store of a data processing system, which auxiliary store affords more effective utilization of working store space.

These and other objects are achieved according to one aspect of the invention by providing a memory subsystem in which a plurality of LSI memory arrays interconnected by a common intrinsic bus are fabricated on an uncut wafer of semiconductor material. After fabrication, each array is successively tested with a multiprobe step-and-repeat tester, and a unique address is assigned to and stored in each operative array. Inoperative arrays are electrically disconnected from the bus by a disconnect device formed as a part of each array.

BRIEF DESCRIPTION OF THE DRAWING

The invention will be described with reference to the accompanying drawing, wherein:

FIG. 20 is a diagram of an assembly organized with a matched set of modules.

FIG. 21 is a diagram of an assembly organized with a matched pair of modules.

FIG. 22 is a diagram of the clock distribution systems of an assembly.

DESCRIPTION OF THE PREFERRED EMBODIMENT

Data Processing System — General

Figure 1:
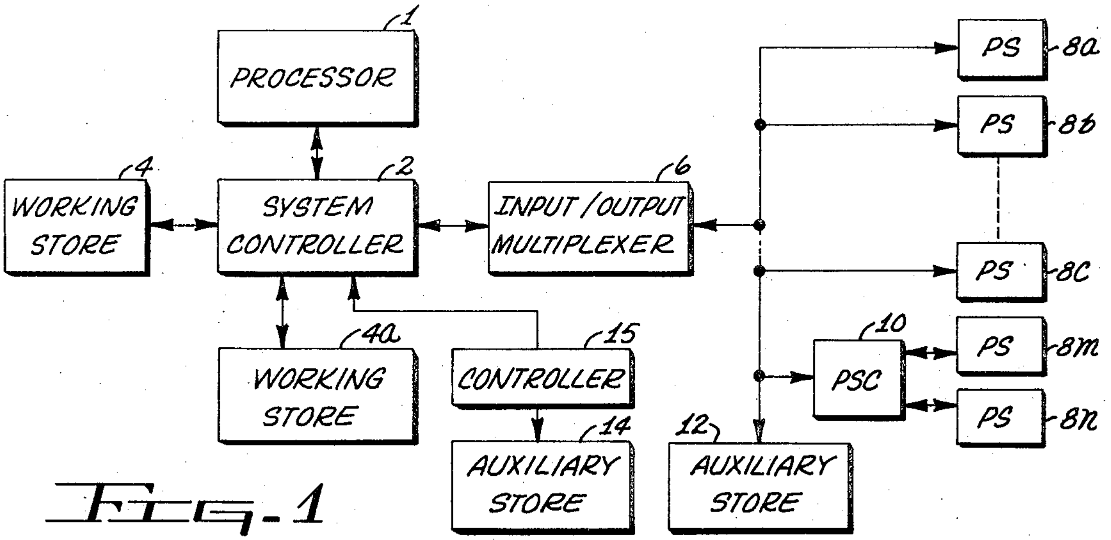
FIG. 1 is a generalized block diagram of a data processing system.

Referring now to the drawing, and in particular to FIG. 1, there is shown a block diagram of a typical data processing system having a processor 1 connected via a system controller 2 to a working store 4 and an input-/output multiplexer (IOM) 6. Additional modules 4*a* of working store may be provided. Connected to the IOM 6 are a plurality of peripheral subsystem devices 8 for supplying input data and receiving output data. One or more of the devices 8*n*, 8*m* may be connected for communication with the IOM 6 via a peripheral subsystem controller 10. For detailed descriptions of the components of a typical data processing system refer to U.S. Pat. Nos. 3,588,831; 3,413,613 and 3,409,880. A detailed description of an IOM may be found in copending application Ser. No. 108,284 filed by Hunter et al. and assigned to the same assignee as the present invention. An auxiliary store 12 may be connected to the IOM 6. Alternatively, an auxiliary store 14 may be connected for communication with the data processing system via a subsystem controller 15.

Figure 2:
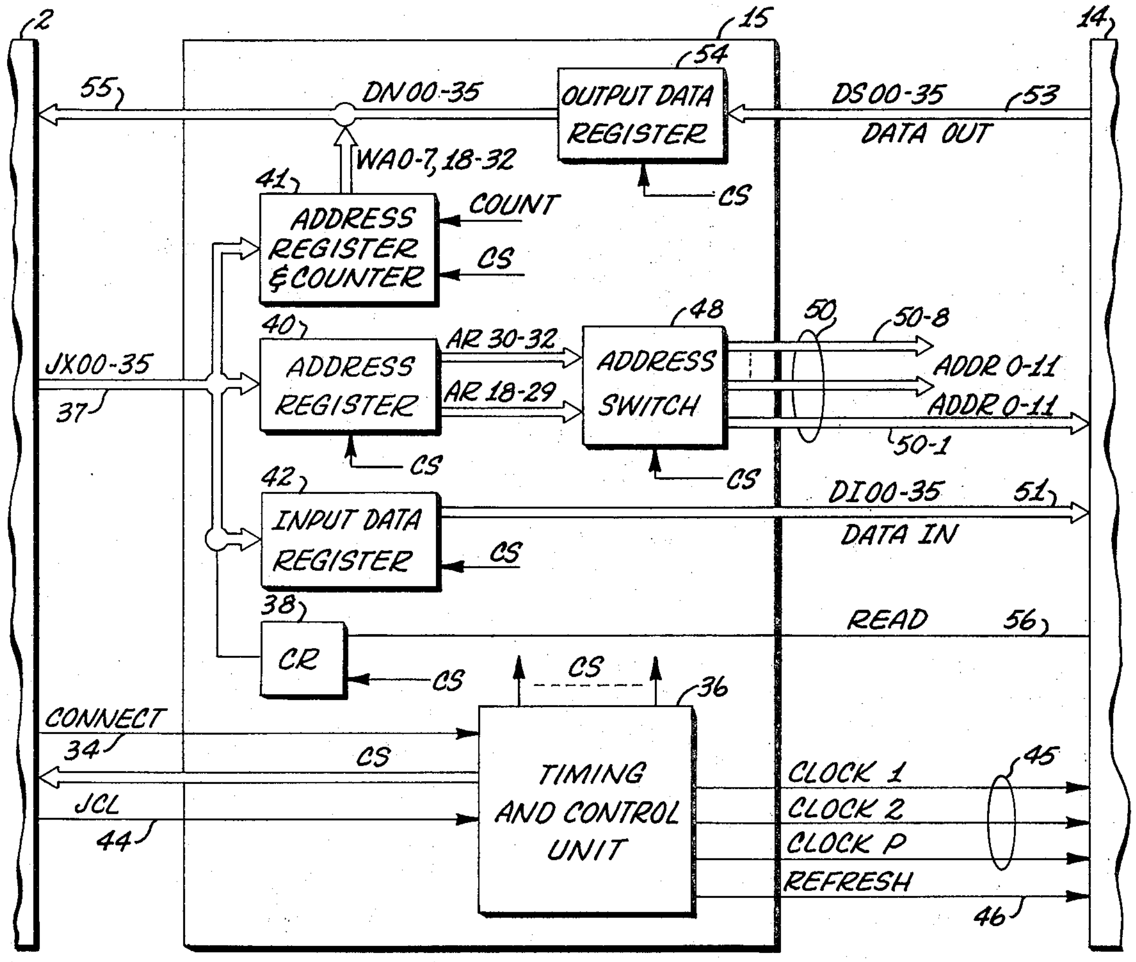
FIG. 2 is a block diagram of a controller.

The controller organization, shown in greater detail in FIG. 2 is representative of and compatible with known controller arrangements. The controller forms no part of the present invention, consequently, the structure of the controller is described with detail sufficient only to establish the interface between the auxiliary store 14 and the data processing system. The structure of the controller 15 and the details of its operation are typical; a more detailed description may be found in the aforementioned U.S. patents and application of Hunter et al.

The system controller 2 initiates an exchange of data between the auxiliary store 14 and the central system by supplying a connect signal to the controller 15 via interface lead 34. A timing & control unit 36 serves to receive signals and pulses from other units within the data processing system and to generate control signals and timing pulses for controlling internal operations of the controller 15, and concurrently with and in response to the internal operations generate other control signals and timing pulses for transfer to the other units in order to maintain synchronization between the independently operating components of the system. The exact manner in which specific control signals, generally designated CS in FIG. 2, are logically derived and timing pulses are generated according to precisely defined conditions within a data processing system at certain precisely defined times has become a matter of common knowledge in the art. Reference is again made to the aforementioned U.S. patents for such detail.

The timing & control unit 36 responds to the connect signal to transfer information signals JXOO-35 to the various components of the controller 15 at the appropriate times, as the JX00-35 signals are enabled onto an information signal bus 37 from the system controller 2. Information signals JX00-35 comprising command, address, and data information are transferred, respectively, to a command register 38, address registers 40, 41 and an input data register 42. Synchronous operation between the system controller 2 and the auxiliary store 14 may be achieved by supplying clock pulses JCL, which may be, for example, working store timing pulses, via interface line 44 to the timing & control unit 36. Alternatively, clock pulses may be generated by a master clock (not shown) in the timing & control unit 26. In the preferred embodiment, three clock signals are supplied by the controller 15 to the auxiliary store 14 via a clock bus 45; a REFRESH signal, via line 46.

Output signals AR18–29 of the address register 40 identify an absolute address in each one of a plurality of segments of the auxiliary store 14. The AR18–29 signals are gated through an address switch 48 to a particular segment of store as address signals ADDRO–11 via an address bus 50. The particular bus 50-1,-2 . . . -8 is selected by the address switch 48 in response to address signals AR30–32. The addressing and organization of the data in the auxiliary store 14 will be discussed in more detail later.

Input data is transferred to the auxiliary store 14 as signals DI00–35 on a DATA IN bus 51. Output data signals DS00–35 from the auxiliary store 14 are transferred via a DATA OUT bus 53 to an output data register 54. The output data signals are subsequently transferred as signals DNOO–35 to the system controller 2, along with working store address signals WA0–7, 18–32. The WA00–19 signals originate in the address register & counter 41 and are derived from the working-store address component of information signals JX00–35. The working-store address held in the address register & counter 41 is incremented in response to a COUNT control pulse from the timing & control unit 36 each time a new data item represented by output data signals DS00–35 is transferred to the output data register 54. A READ signal derived from the contents of the command register 38 and transferred to the auxiliary store 14 via interface lead 56 controls the operation of the auxiliary store to read or write data as will be explained hereinafter.

Data Store Subsystem — General

Figure 3:
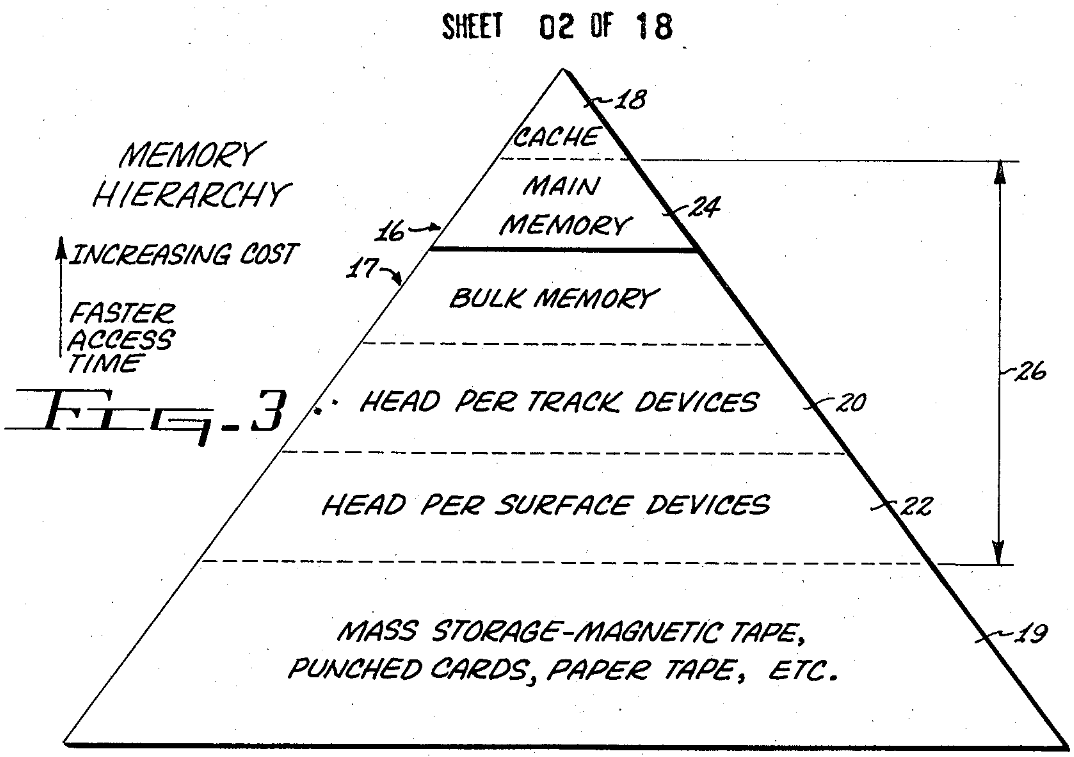
FIG. 3 is a diagrammatic representation of a memory hierarchy in a data processing system.

The various storage components in a data processing system form what is termed a memory hierarchy. FIG. 3 is a diagrammatic representation of a typical memory hierarchy having a working store 16 and an auxiliary store 17. The size of the areas within the large triangle of FIG. 3 represents the relative storage capacity of the various devices and functional entities represented. Thus a cache memory 18 has the smallest storage capacity, and mass storage devices 19 such as magnetic tape store voluminous amounts of data. The position of the various components of the memory hierarchy in the FIG. 3 diagram is an indication of both the relative cost per unit of storage and the access time inherent in the devices. For example, head per track devices 20 have a higher cost per unit of storage and a faster access time than head per surface devices 22. Main memory 24 generally comprises one or more fast access, virtually zero latency, high cost per bit devices such as a coincident current magnetic core memory or a semiconductor device memory. The "latency" of a computer store is defined as the time interval between the instant the control unit (e.g., IOM 6 or controller 15 of FIG. 1) signals the details (e.g., the address) of a transfer of data to or from the store and the instant the transfer commences. The working store 16, as a functional entity, may include or in some system architectures be limited to the ultra-fast cache memory 18.

Still referring to FIG. 3, the present invention provides an LSI semiconductor store unit suitable for replacing units in the memory hierarchy in the range represented by the arrow 26. The most significant effect of the present invention on system architecture is a reduction in the size of the working store 16. The reasons underlying the reduction are explained with reference to FIGS. 4 and 5. In a multiprocessing environment, several programs or program segments may be resident in the working store at the same time in various stages of execution. Execution of certain of the resident programs will often be delayed due to a need for an auxiliary store access to retrieve another segment of the program or to call another program into action from the working store. The programs are delayed for a length of time equal to the access time of the auxiliary store plus queueing delays inherent in the exchange algorithm of the management control subsystem. A management control subsystem for a data processing system is the subject of U.S. Pat. No. 3,618,045, assigned to the same assignee as the present invention. "Access time" is defined as the time interval between the instant the control unit calls for a transfer of data to or from the store and the instant the operation is completed. The access time is the sum of the latency of the store and transfer time. The "transfer time" is the time interval between the instant the transfer of data to or from the store commences and the instant it is completed. There must be a sufficient number of program segments resident in the working store to allow the processer to continue working as the aforementioned program execution delays occur. If average access time is shorter, then fewer programs need to be resident in working store, and less working store is required.

Figure 4:
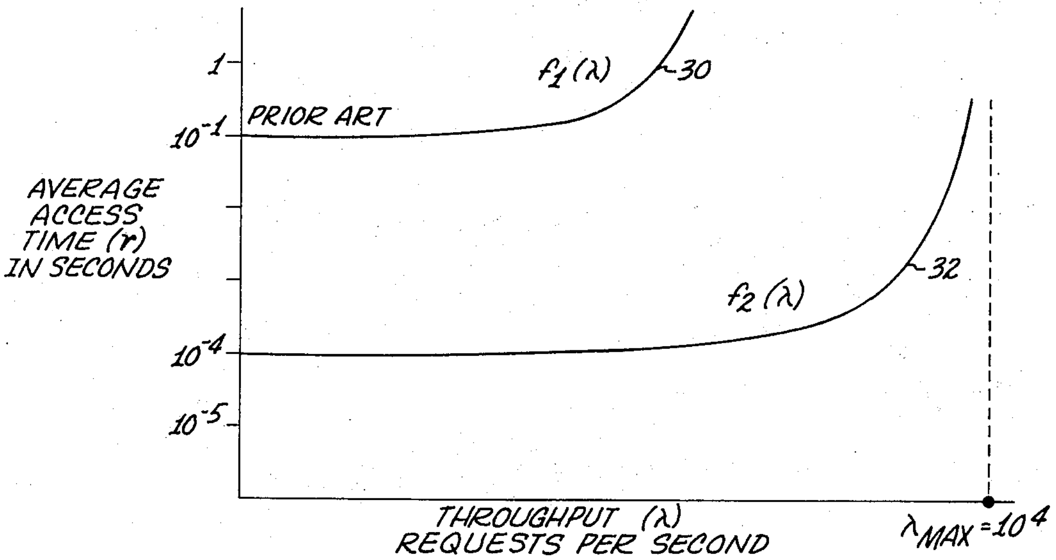
FIGS. 4 and 5 are graphs which compare the operation of the present invention with the prior art.

Referring now to FIG. 4, curve 30 represents the average access time versus throughput for a prior art system having an auxiliary store comprising several conventional disc storage units. The lowest average access time for the prior art auxiliary store is typically 100 milliseconds for a 256-work data block. Curve 32 represents the average access time versus throughput for one embodiment of the present invention in which the lowest access time is 100 microseconds for a 256-word data block. The curves 30, 32 are determined using the Poisson probability distribution. Letting $\alpha$ be the average time interval between program execution delays, then $1/\alpha = \lambda$ is the average throughput in requests per second to the auxiliary store. To account for queueing delays, let the average access time versus throughput be $r = f(\lambda)$. The average access time for the prior art auxiliary store represented by $f_1(\lambda)$ rises much sooner with increased throughput than for the virtually zero-latency auxiliary store of the present invention represented by $f_2(\lambda)$.

Figure 5:
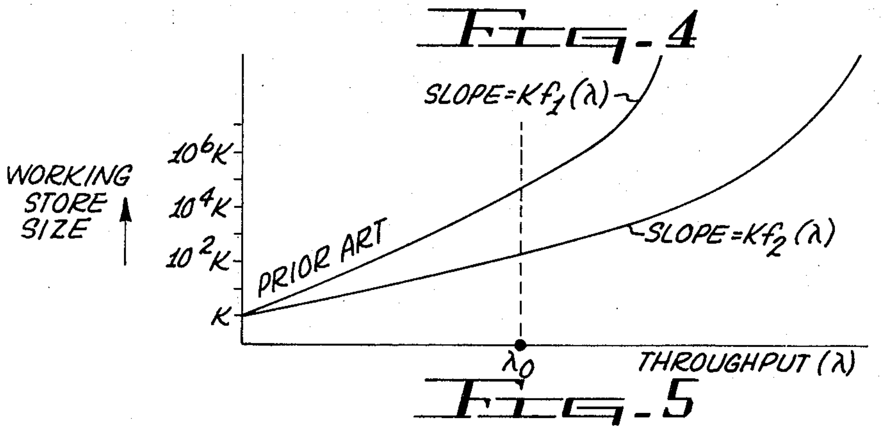

Referring now to FIG. 5, the average number ($n$) of program segments resident in working store required to keep the processer busy is approximated $$n - 1 = r/\alpha = \lambda f(\lambda), \text{ or}$$

$$n = \lambda f(\lambda) + 1$$

Let $k$ be the average storage space required for each program segment. The working store capacity ($c$) required is $$c = kn - k\lambda f(\lambda) + k$$

It is evident from FIG. 5 that for any given throughput load ($\lambda_o$) the auxiliary store of the present invention ($f_2$) requires less working store in the data processing system than does the prior art auxiliary store ($f_1$).

Data Store Subsystem — Physical Description

The general terms used to describe the separate physical elements of my invention are defined as follows:

An "array" comprises a plurality of electrically connected storage cells, an input-output bus portion, and overhead circuits including a disconnect device. Each cell stores one bit of information. The array is the smallest addressable physical entity. An absolute address is stored in the overhead circuits of each array. The terms "basic circuit" and array are used interchangeably.

A "group" comprises a plurality of electrically connected arrays on a common substrate. The group is operative with an arbitrary number of defective arrays. The group is defective if a disconnect device or an input-output bus portion is defective.

A "module" comprises one or more electrically isolatable groups on the same substrate or wafer. The module is operative with an arbitrary number of defective groups. Packaging is introduced at the module level. The terms "wafer" and module are used interchangeably, however, a wafer is generally considered an unpackaged module.

An "assembly" comprises one or more modules together with external circuit packages, e.g., clock drivers and sense amplifiers. The number of operative addressable arrays in the assembly is constrained to be an integer power of the radix of the address number.

A "segment" of store comprises a plurality of assemblies, each having a separately connected data input lead and a separately connected data output lead, the assemblies having common address lines thereby forming a block-addressable store.

A "card" comprises one or more assemblies on a printed circuit board.

An organizational element of the auxiliary store (i.e., an element which does not delineate a separable physical element) is a "data block." The data block is a fixed quantity of data which is a combination of bits, bytes, characters or words.

Figure 6:
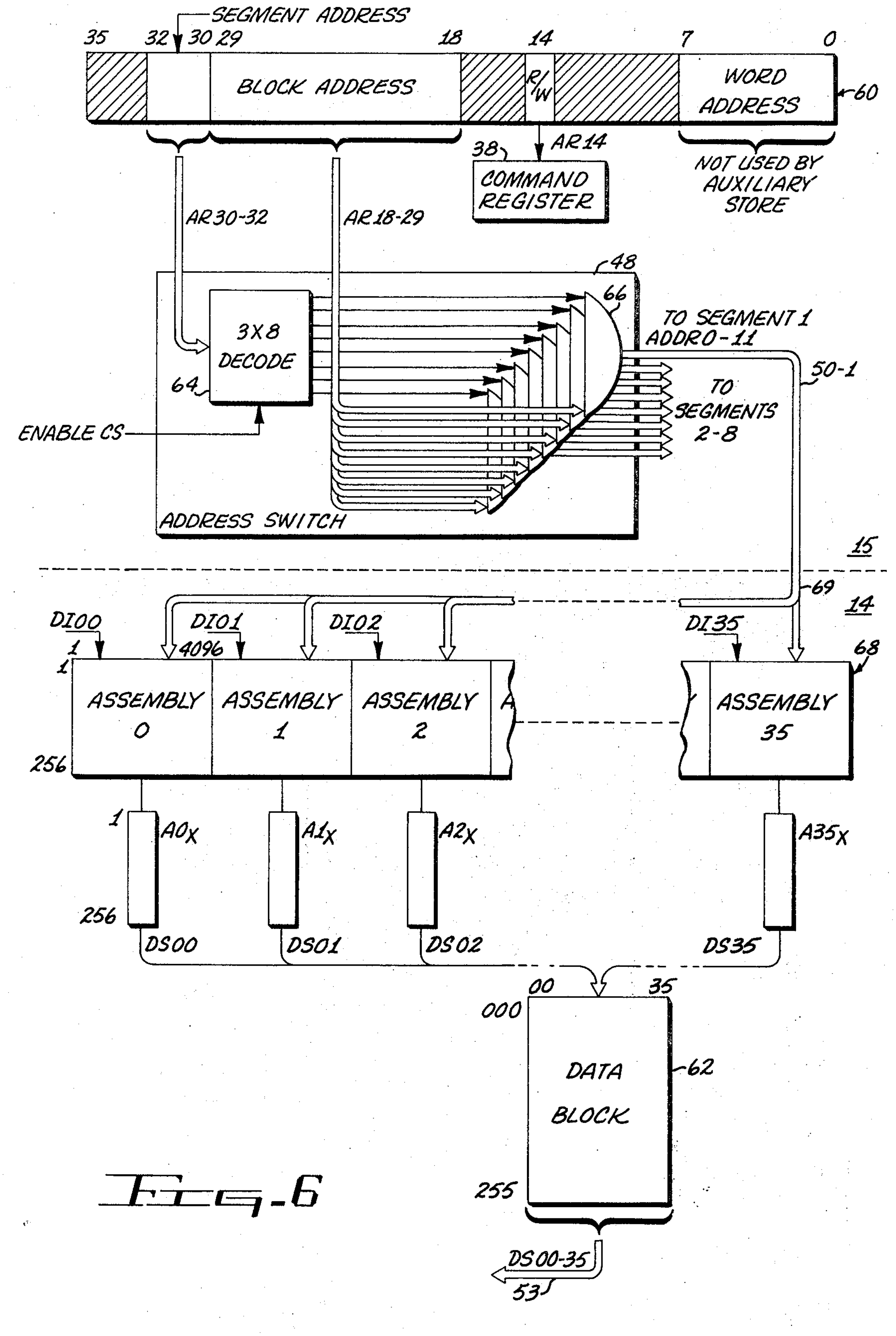
FIG. 6 is a block diagram illustrating the organization of one embodiment of a data processing system store.

A typical physical organization for the auxiliary store of my invention and an exemplary addressing arrangement are shown in FIG. 6. A data item 60 is diagrammatically illustrated comprising command and address information. The data item length was arbitrarily chosen as 36 binary digits for describing a typical arrangement. The choice of either a 36 bit word, or any other of the numbers delimiting store size, is not intended to limit in any way the scope of the invention. In the illustrative embodiment, bits 0–7 of data item 60 are representative of the absolute address of a word within each one of a plurality of data blocks. A data block 62 is diagrammatically illustrated in FIG. 6 comprising 9,216 bits of data arranged as 256 36 bit words. The data block is the smallest addressable entity of store in the auxiliary store 14 being described with reference to FIG. 6. Address bits 0–7 of data item 60, being word identifiers, are therefore not transferred to the auxiliary store 14, but are held in the address register & counter (41 FIG. 2) of the controller 15. Address bits 0–7 are incremented binarily each time a word of a data block is transferred from the auxiliary store 14 to the controller 15, and used for supplying a word address to the working store.

Still referring to FIG. 6, bits 18–29 of data item 60, representative of a block address, are transferred as the AR18–29 signals to the address switch 48. The address switch 48 is a conventional logic element switching device comprising a three-lead to eight-lead decode matrix 64 and eight sets of twelve 2-input AND logic elements 66. In response to an ENABLE control signal and the AR30–32 signals, the address switch 48 transfers address signals AR18–29 as the ADDR0–11 signals to one of eight segments of auxiliary store 14. A single segment 68 is diagrammatically represented in FIG. 6 comprising 36 assemblies labelled ASSEMBLY 0, 1, 2 . . . 35. ASSEMBLY 0 is typical and represents a physical entity or store having a storage capacity of 256 × 4096 or 1,048,576 bits of data. An assembly contains 4096 arrays of store, each array storing 256 bits of data. One representative array from each of the ASSEMBLIES 0, 1, . . . 35 is diagrammatically represented in FIG. 6 and labelled, respectively, $A0_x$, $A1_x$, . . . $A35_x$. The ADDR0–11 address signals are transferred to each of the ASSEMBLIES 0, 1, . . . 35 of the segment 68 via an address bus 69. During a write operation, DATA IN signals DI00–35 are transferred from the input data register (42 FIG. 2), each to the corresponding ASSEMBLY 0, 1, . . . 35 of the segment 68, as shown in FIG. 3. Thus, for any given address x, data is written into 36 storage arrays $A0_x$, $A1_x$, . . . $A35_x$, one from each of the ASSEMBLIES 0, 1, . . . 35 of the segment 68. Similarly, during a read operation from address *x*, the contents (256 bits each) of arrays $A0_x$, $A1_x$, $A2_x$ . . . $A35_x$ are transferred, each array serially by bit, as signals DS00, 01, 02 . . . 35 to the controller 15 via the DATA OUT bus 53. Thus, an addressed data block is transferred serially by word from the auxiliary store 14 to the controller 15.

The state of bit-14 of the data item 60 determines the type of operation performed for the corresponding address. If bit-14 is logical 1 a read operation is performed; if logical 0, a write operation. The bit-14 command information (AR-14) is held in the command register 38 during execution of the operation.

Figure 7:
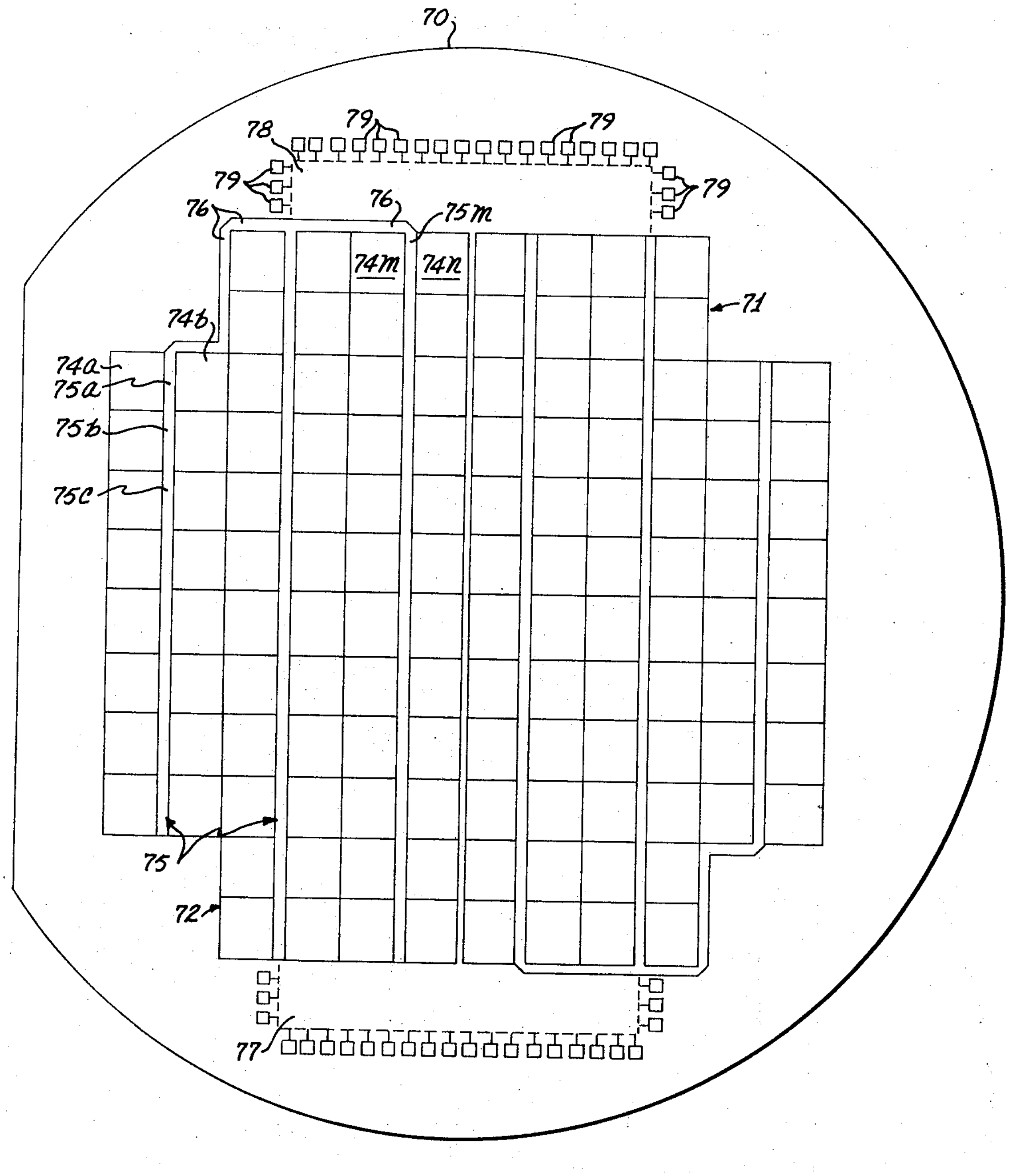
FIG. 7 is a diagrammatic plan view of a wafer having a plurality of basic circuits formed thereon in accordance with the invention.

FIG. 7 illustrates one embodiment of a module prior to packaging comprising a substrate 70 haaving two groups 71,72 of arrays. Each group includes sixty-four arrays in pairs, e.g., in the left-hand group 72, the array-pair 74*a*, 74*b*. Formed as an integral part of and interconnecting the arrays is an input-output bus 75. The bus 75 comprises a plurality of bus portions 75*a,b,c*, . . . *m* . . . Each bus portion bisects an array pair, e.g., bus portion 75*m* bisects two arrays 75*m*,75*n*. Associated with and adjacent to each group 71,72 is a corresponding group overhead area 77,78. The group overhead areas 77,78 provide space for supplementary circuits such as group clock drivers, and include a plurality of pads 79 for attaching conductive leads which connect the group to external connectors (not shown). The input-output bus 75 is connected to the overhead area 78 by a group bus 76.

Figures 8, 9, 24A, 24B, 24C:
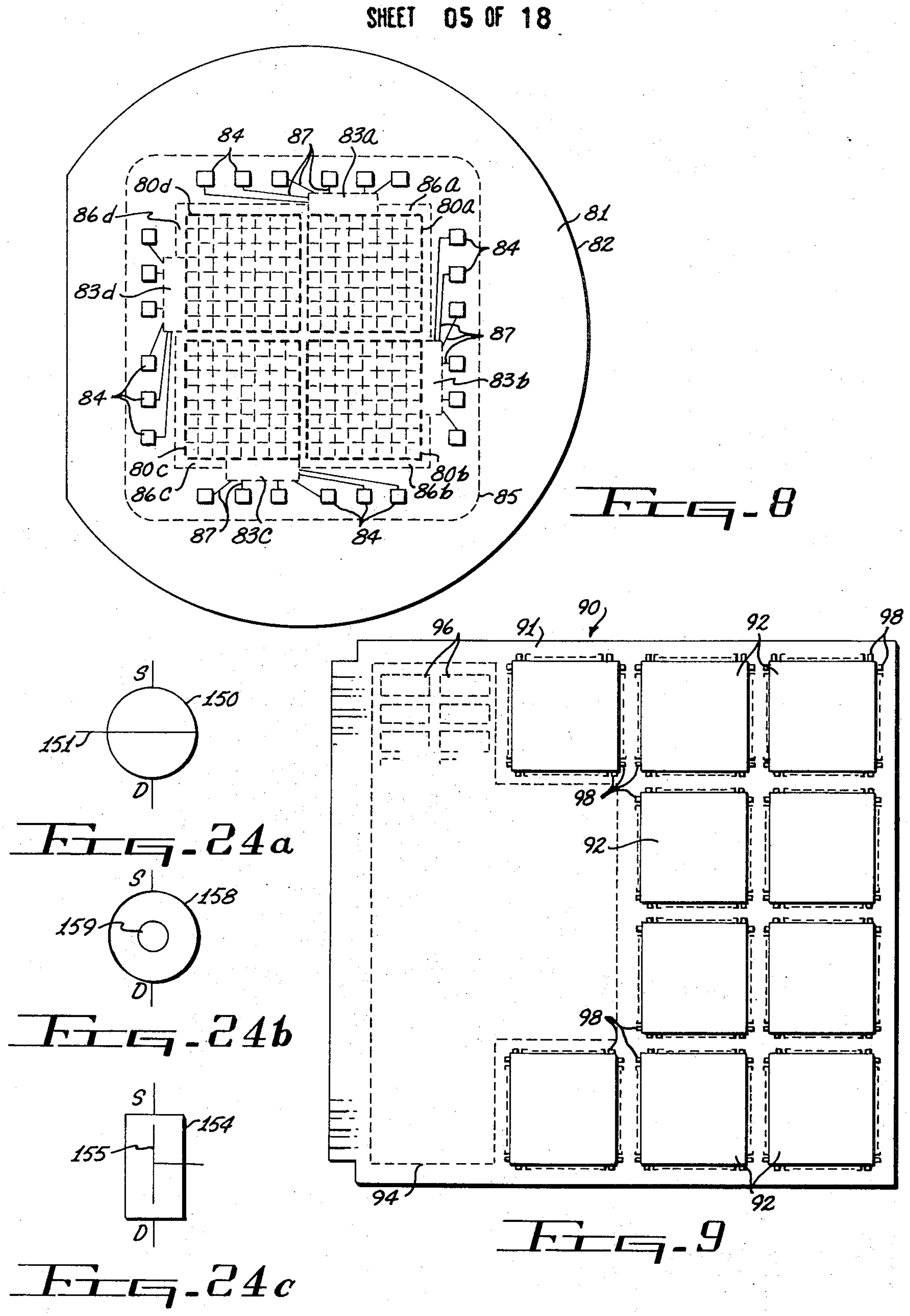
FIG. 8 is a diagrammatic plan view of a wafer having several groups of arrays formed thereon.
FIG. 9 is a plan view of a printed circuit board having a plurality of modules mounted thereon.
FIGS. 24*a*, *b*, and *c* are schematic symbols used for describing a preferred embodiment of the invention.

FIG. 8 is a plan view of another embodiment of a wafer prior to packaging showing an organization comprising four groups 80*a,b,c,d* formed on a surface 81 of a substrate 82. Each group 80*a,b,c,d* comprises 64 arrays as represented by the dashed lines lying within the perimeter of each group. Associated with each group 80*a,b,c,d* is a corresponding group overhead area 83*a,b,c,d*. Twenty-four contact pads 84 are disposed around the periphery of the wafer 80 within the bounds of a wafer trim line 85. Smaller pads 79 (see FIG. 7) associated with each of the overhead areas 83*a,b,c,d* are not shown in FIG. 8. The wafer organization illustrated in FIG. 8 reflects an alternate mode of making external connection during manufacture of the wafer. FIG. 7 illustrates a module having twenty-four pads 79 per group for making external connections. The alternate embodiment of FIG. 8 illustrates an arrangement having another level of contact pads 84 relatively massive in comparison with the pads 79 of FIG. 7. In the FIG. 8 embodiment, each one of the twenty-four pads (not shown) of each of the four group overhead areas 83 is connected to corresponding ones of the twenty-four pads in the other group overhead areas 83. Thus, the common signals of the groups 80*a,b,c,d* are bussed together via a group interconnect bus 86*a,b,c,d* to form a large single group. The large single group may, however, be partitioned into smaller groups by severing one or more of the group interconnect buses 86*a,b,c,d*. Similarly, defective smaller groups may be isolated from the larger groups, e.g., group 83*c* may be isolated from the larger group comprising groups 80*a,b* and *d*. A group may be isolated by means of frangible sectors separable by any suitable energy source including thermal, electrical, radiant, mechanical, electron beam, etc. Alternatively, a disconnect circuit, as for example the type disclosed hereinafter, may be utilized.

Electrical conductors 87 which may be, for example, fly wires, mask deposited metal leads, and/or diffused runs connect the pads (not shown) of the group overhead areas 83 to the module contact pads 84. Alternatively, each group 80*a,b,c,d* may be arranged to have individual external electrical connections in which case ninety-six module contact pads 84 would be provided.

The modules shown in FIGS. 7 and 8 are not drawn to scale, the groups being greatly enlarged to facilitate description. A typical group having sixty-four 256-bit arrays actually occupies an area of about 1 square cm. An illustrative embodiment of the auxiliary store of my invention comprises modules having silicon substrates originally 8 cm in diameter trimmed to square substrates having an active area 5 cm on a side. Each substrate has 1600 arrays formed thereon. Of the 1600 arrays, about 70 percent or 1120 are usable; actual yields have been found to be higher. The module may consist of a single group of 1024 usable arrays, 4 groups of 256, or 25 groups of 41 usable arrays per group. Assuming the latter case and very conservatively allowing five defective groups per wafer, the illustrative module yields 20 usable groups, each group having 41 usable arrays of a potential 64, for a total of 820 operating arrays. Assuming there are twelve address lines in the input-output bus, 5 modules then constitute an assembly of $2^{12}$ or 4096 addressable arrays. With sufficiently high yields, however, assemblies of 4096 arrays with 4 modules and $2^{14}$ arrays with 15 modules may be formed. The illustrative embodiment is therefore modularly expandable in segments of $2^{20}$ or 1,048,576 words. In an alternate embodiment having 8 address lines and 160 storage cells per basic circuit, the store is modularly expandable in segments of $5 \times 2^{13}$ or 40,960 words.

FIG. 9 illustrates a typical card 90 which may be, for example, a multilayer printed circuit board 91 having ten modules 92 mounted thereon. An area 94 of the card 91 is reserved for the placement of circuit packages 96 comprising assembly elements such as clock drivers and sense amplifiers. Details of the circuits and the circuit interconnections at the card level are not described or shown herein as such details are well known in the art and described in the literature. See Electronic Digital Components and Circuits by R. K. Richards, D. Van Nostrand Company, Inc., 1967; and Handbook of Materials and Processes for Electronics, edited by Charles A. Harper, McGraw-Hill, 1970, pages Z13 and 14.

Each module 92 is physically attached to printed circuit elements of the board 91 by a plurality of electrically conductive leads 98, which leads are also electrically connected to the module circuit pads, e.g., the contact pads 84 of FIG. 8 or the pads 79 of FIG. 7.

Assembly Organization

In the preferred embodiment an assembly is defined as a complete, binary addressable unit of store where the number of arrays is an integer power of 2. Each array in the assembly is assigned a unique binary address in a manner which will become apparent in the ensuing discussion of the circuits of the preferred embodiment of my invention. Physically, the assembly comprises a collection of modules together with the associated bipolar clock and signal drivers and sense amplifiers mounted on a printed circuit board (see FIG. 9).

Matched-set Organization

Referring to FIG. 20, modules in this organization are address programmed in matched sets, with addresses ranging from zero to the desired assembly capacity. Each module is utilized, low yield as well as high yield, by address programming each operative array of the module binarily in sequence (perhaps leaving 1 percent as spares) and beginning the address assignment of the next module with the next contiguous address in the sequence, until enough arrays have been address programmed to achieve the desired assembly capacity. The collection of modules then forms a matched-set assembly, an example of which is shown in FIG. 20. Referring to FIG. 20, 751 operative arrays in module 1 are assigned binary addresses from 0 to $750_{10}$. Module 2 having 785 operative arrays is assigned addresses $751_{10}$ through $1535_{10}$, and so on through module 5 where 885 good arrays are each assigned binary addresses in sequence from $3211_{10}$ to $4095_{10}$. The matched-set organization offers the highest utilization of arrays produced, regardless of actual yield. The cost per unit of store is determined at the assembly level rather than at the module level, therefore, short term yield variations brought about by the decrease in the average number of good arrays per module are offset because even low yield modules may be used to form an assembly. As yield increases, the cost per unit of store at the assembly level decreases dramatically without array redesign, since fewer modules are used in an assembly.

Matched-Pair Organization

Referring to FIG. 21, in the matched-pair organization (which may be a subset of the matched-set organization) each module is initially address programmed from zero to the number of operative arrays. Pairs of modules are then selected such that the total number of good arrays is equal to or greater than an integer power of 2. The binary address signals applied to module 1 are complemented in inverter circuits 128 and applied to module 2. The pair of modules thus forms an assembly with a storage capacity which is addressable to the selected integer power of 2, with an address overlap area in the middle. In the example shown in FIG. 21, 651 good arrays in module 1 are address programmed sequentially from 0 to $650_{10}$; 389 good arrays in module 2 are programmed from 0 to $388_{10}$, or when complemented binarily, from $(\overline{1023_{10}})_2$ to $(\overline{635_{10}})_2$. The overlap thus addresses 16 arrays in both module 1 and module 2. For example, as shown in FIG. 21, contiguous arrays in the overlap area are addressed in module 1 by addresses $\mathbf{640_{10}}$ and $\mathbf{641_{10}}$. Corresponding arrays in module 2 having binary addresses $\mathbf{383_{10}}$ and $\mathbf{382_{10}}$ stored therein are responsive to the binary-complement addresses $\overline{\mathbf{640_{10}}})_2$ and $(\overline{\mathbf{641_{10}}})_2$. The overlapped addresses present no problem since data is simply stored and retrieved simultaneously by both addressed arrays.

A matched pair may form an assembly, or a number of matched pairs may be collected to achieve the desired assembly storage capacity. This arrangement is advantageous in that the testing and programming of each module is identical. Further, when the average number of arrays per module is near an integer power of 2, then high yield parts can be paired with low yield parts to achieve nearly total utilization of modules.

Single Organization

In this organization, each module is required to have a number of good arrays which is equal to an integer power of 2. In the single organization, each module is usable as an independently addressable entity. The advantages of the single module organization are simplicity and smaller module size due to fewer address lines.

Array-Physical Description

Figure 10:
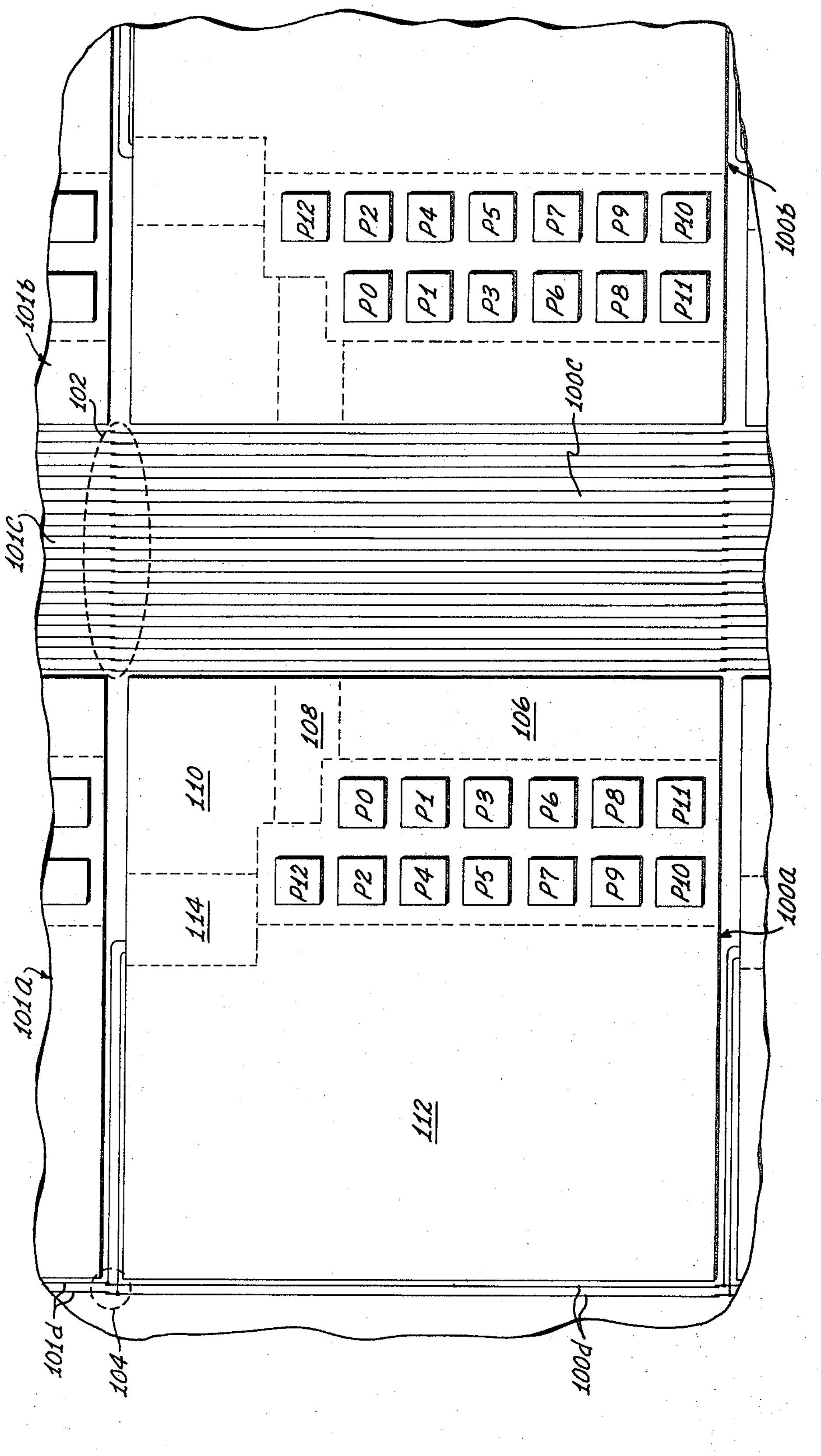
FIG. 10 is a greatly enlarged diagrammatic plan view of a fragment of a wafer showing the layout of a single array.

Referring now to FIG. 10, a diagrammatic plan view of an array pair 100 is shown comprising a left-hand array **100*a* and a right-hand array 100*b*. The latter, shown only in part, is a mirror image of the left-hand array 100*a*. A central input bus portion 100*c* comprising a plurality of input lines services both arrays 100*a,b*. An output data bus portion 100*d* on the left side of the left-hand array 100*a* is considered an integral part of the array 100*a*. A portion of another array pair 101 is shown adjacent to the array pair 100. The central bus portions 100*c*,101*c* and the output data bus portions 100*d*, 101*d* are aligned and abut one another, respectively, in areas 102,104 shown circled by dashed lines. The output bus portion 100*d* may also service an array (not shown) adjacent and to the left of array 100***a*. Thus, an input-output bus portion comprising the central input bus portion 100*c* and an output bus portion 100*d* services two arrays. Collectively, the bus portions form an input-output bus or signal distribution system common to all arrays in the group.

The various circuits comprising the array 100*a* are delineated by dashed lines in FIG. 10 according to the area occupied on the array 100*a*. The circuits comprise an address match logic 106 which includes array address programming pads P0–P11, a control logic 108, clock driver circuits 110, a shift register 112, and data output driver circuits 114. Output data is transferred from the driver circuits 114 to the output data bus 100*d*. Input signals from the bus portion 100*c* are transferred from the bus 100*c* to the adjacent circuit areas 106,108,110 via a plurality of leads (not shown) underlying and perpendicular to the leads of the bus 100*c*.

One embodiment of my invention was fabricated using the silicon-gate process. As an aid to understanding the manner in which an interconnected group is formed from a plurality of identical basic circuits, the sequence of operations in the fabrication of silicon gate semiconductor integrated circuits will first be discussed with reference to FIGS. 11–15 and 16–19. FIGS. 11, 12, 13, 14 and 15 show greatly enlarged (approximately 100X) master masks used in fabricating one embodiment of the LSI array of this invention. Although a complete master mask comprises two basic circuits or arrays (i.e., the right and left-hand arrays of FIG. 10) substantially in mirror image, only one complete array is shown in each of the master masks of FIGS. 11–15 in order to enhance the visibility of the minute images.

The term "master mask" refers to one of a set of artworks depicting a single basic circuit which is first drawn on a large scale in order to manufacture one of the set of wafer-size masks used for fabricating a plurality of the basic circuits on a wafer. The wafer-size mask is produced from the large-scale master mask by greatly reducing the drawing and repeatedly reproducing it photographically by the step-and-repeat process. On every displacement of the master mask by the size of one basic circuit, the mask is again reproduced. Repeating the procedure step-by-step and row-by-row produces a wafer-size mask of a plurality of basic circuits. The present invention is made utilizing wafer-size masks to produce a plurality of basic circuits interconnected by virtue of precise alignment of the master mask image during the step-and-repeat process, whereby the bus portions of each basic circuit are joined to form a common signal distribution bus. No unique wafer-size masks are utilized. Master masks for the overhead areas and group buses (see FIGS. 7 and 8) are stepped into the wafer-size mask in the appropriate locations. In the ensuing discussion, the term mask is used interchangeably to describe both a master mask and a wafer-size mask.

Figure 11:
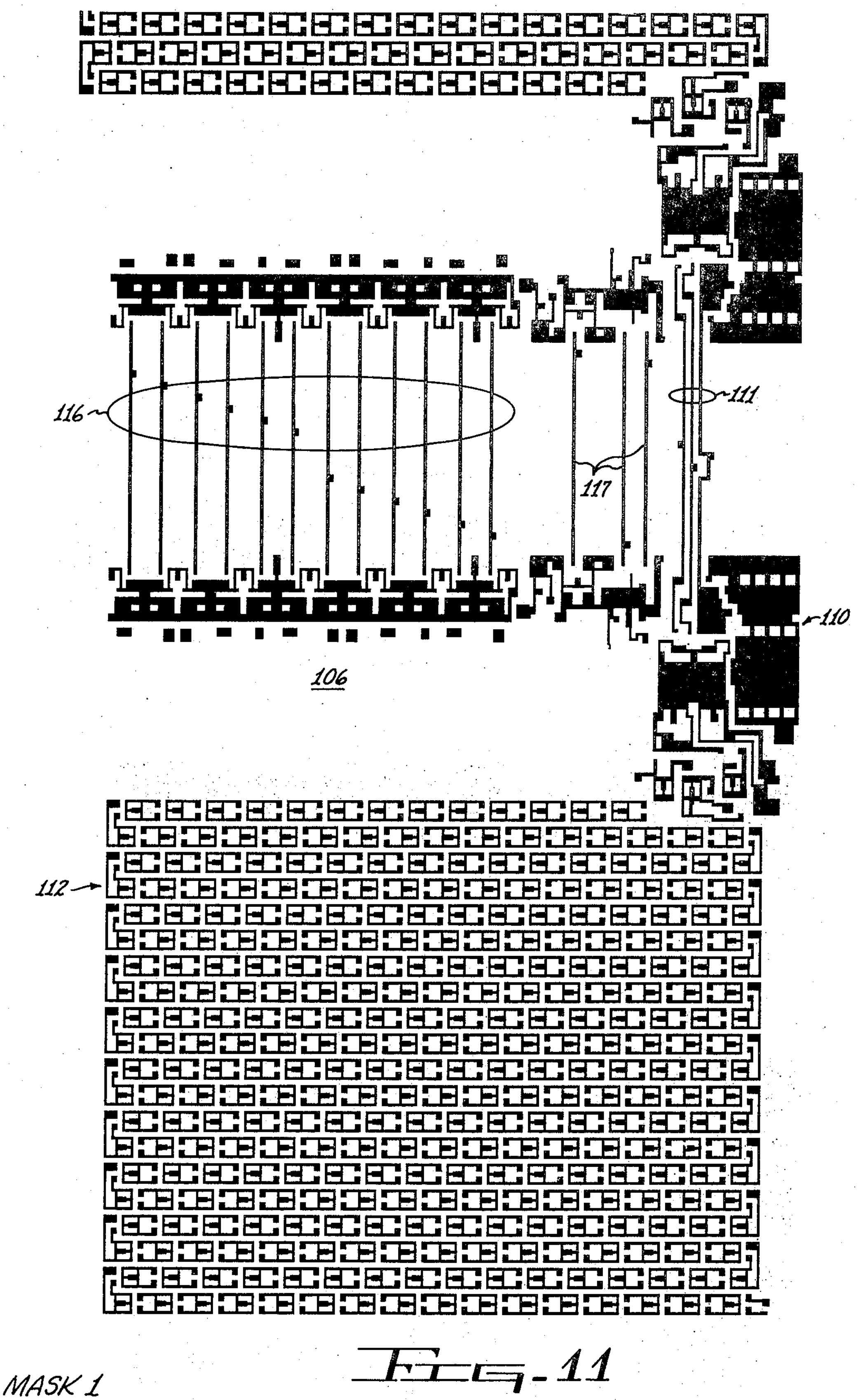
FIGS. 11, 12, 13, 14, and 15 are greatly enlarged planar views of the masks used in the fabrication of the integrated circuit array of this invention.
Figure 12:
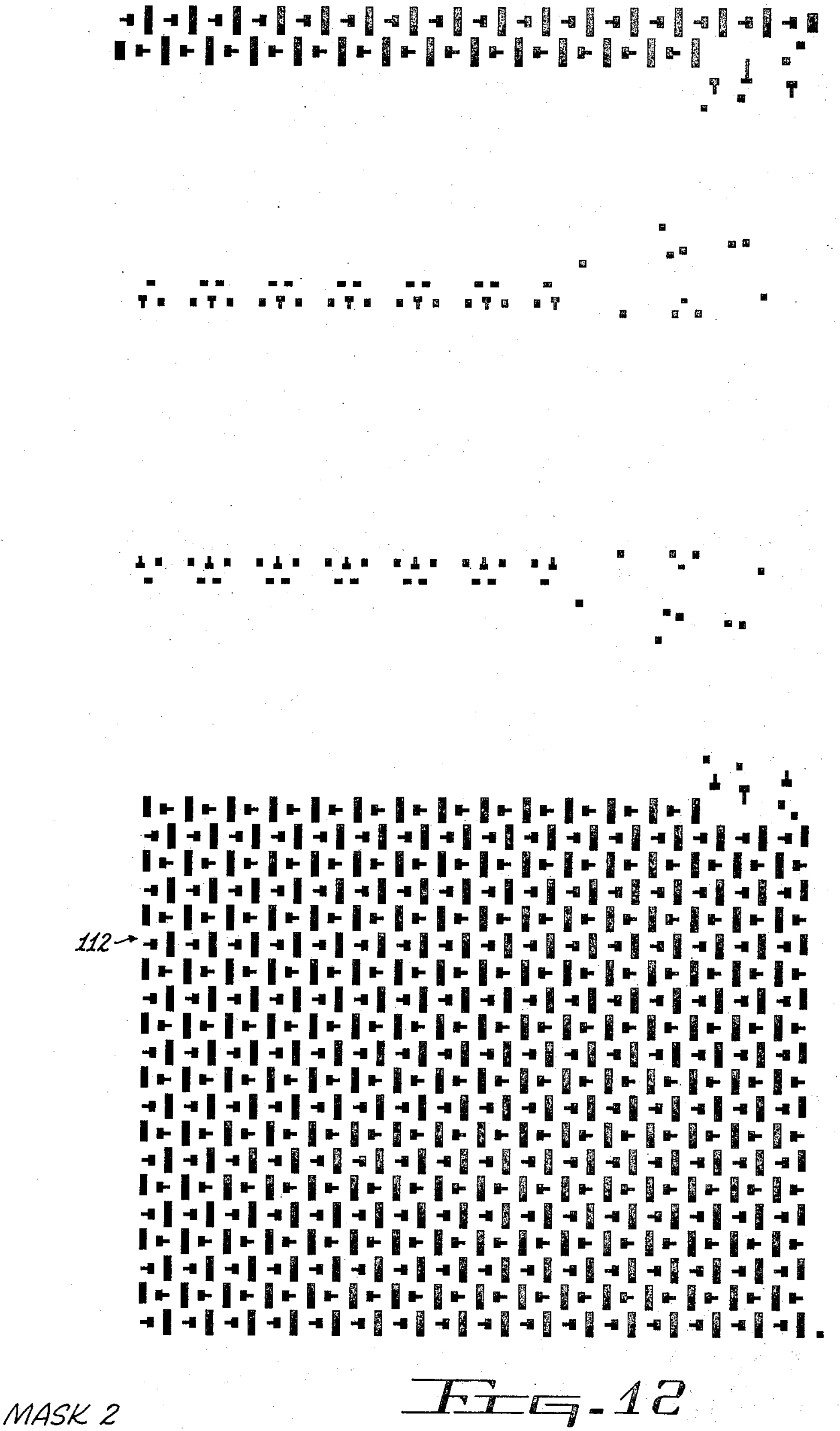

The masks of FIGS. 11–15 are placed successively in alignment over the circuit during the various photolithographic masking operations. It can be seen that the images defined by the masks of FIGS. 11–15 correspond generally with the layout of FIG. 10 and thus serve to depict explicitly the basic circuit of a preferred embodiment of my invention. Referring for example to FIG. 11 in conjunction with FIG. 10, reference numeral 12 identifies the general area defining a 320-bit shift register. Lines 116, FIG. 11, show the position of diffused runs underlying and perpendicular to the runs of the input bus portion (100*c* FIG. 10, FIG. 15). The diffused runs 116, FIG. 11, connect the address signals ADDR0-11 to the address match logic 106. Diffused runs 111 connect the clock signal lines of the input bus 100*c* (FIGS. 10,15) to the clock driver circuits 110.

Figure 17:
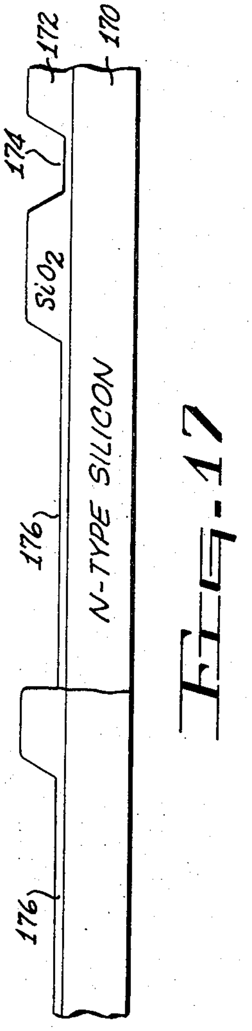
FIGS. 17, 18 and 19 are section views of the structure of FIG. 16 during successive stages of manufacture taken along line 17—17 of FIG. 16.
Figure 18:
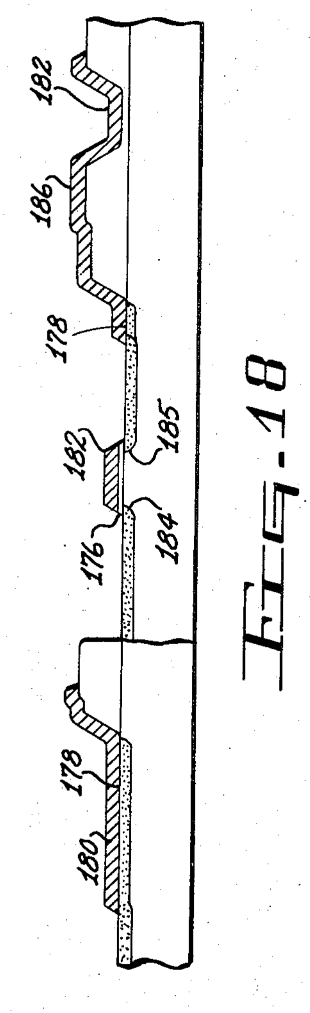
Figure 19:
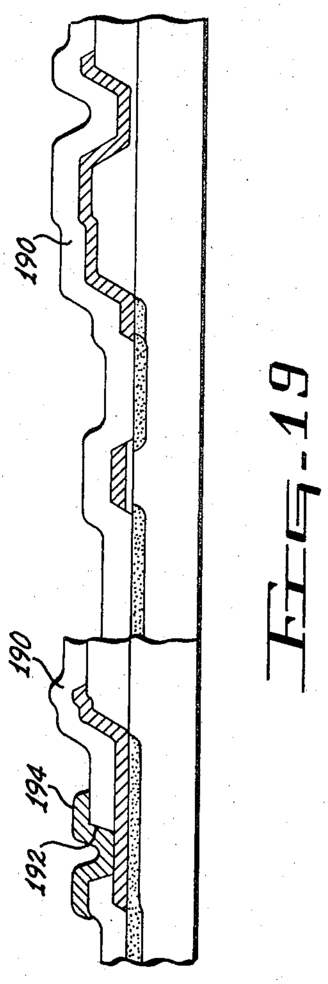
Figure 16:
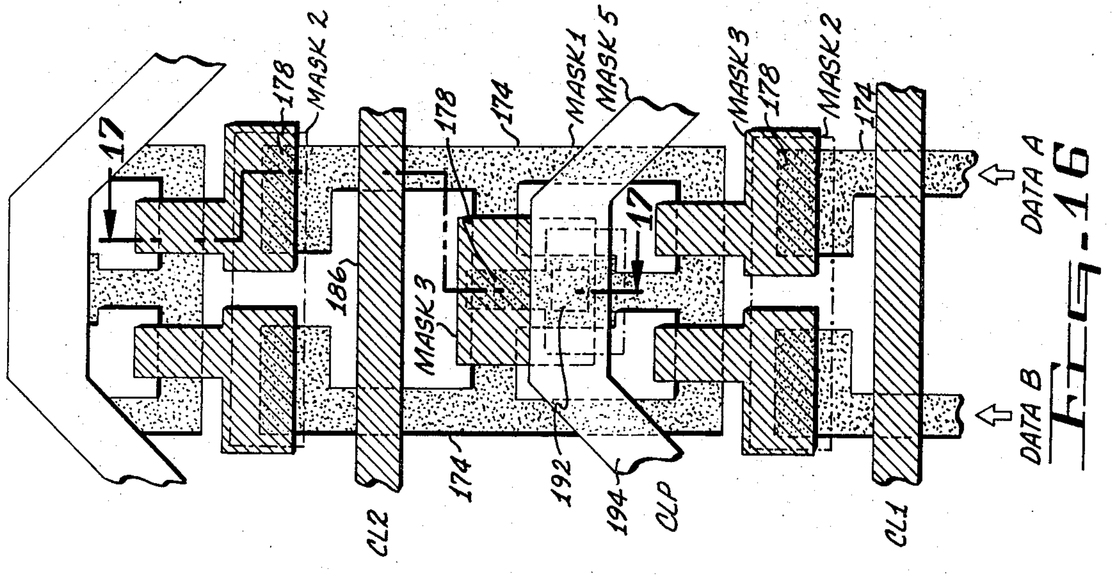
FIG. 16 is a plan view of a fragment of the masks of FIGS. 11–15 aligned and superimposed together.

Referring now to FIG. 16, a small portion of the shaft register area 112 of each of the masks of FIGS. 11–15 is shown aligned in FIG. 16. FIGS. 17, 18 and 19 are section views of the structure of FIG. 16 during successive stages of manufacture, taken along line 17—17 of FIG. 16.

Referring now to FIG. 17 in conjunction with FIG. 16, a wafer of N-type monocrystalline silicon 170 is used as the substrate material and a layer of $SiO_2$ is thermally grown or deposited on the substrate. Using mask 1 (FIG. 11), areas 174 are etched in the $SiO_2$ layer 172 by standard photolithographic masking and etching techniques. The etched areas 174 will subsequently be processed to form source and drain regions of the active devices, as well as a portion of the first interconnection plane. FIG. 11, mask 1, depicts the areas so etched.

Still referring to FIGS. 16 and 17, after etching the $SiO_2$ 172 using mask 1, a thin layer 176 of $SiO_2$, termed gate oxide, is grown on the entire surface of the wafer. Using mask 2, (FIG. 12) the thin oxide is etched away in areas 178, see FIG. 18, where direct contact is to be made between the diffused regions 174 defined by mask 1 and a polycrystalline silicon layer 180, deposited in the next described step. Referring to FIGS. 18 and 16, the layer 180 of polysilicon is deposited over the entire surface of the wafer, and mask 3 (FIG. 13) is then utilized to mask and etch the polysilicon layer 180 to define the device gates 182 and complete the first interconnection plane. The thin layer of gate oxide underlying the removed polysilicon is also etched away during this step. The latter step characterizes the self-aligning feature of the silicon-gate process whereby the polysilicon acts as a mask, preventing the gate oxide 176, FIG. 18 from being etched away. The structure is now prepared for the diffusion operation which is carried out, preferably using boron, to form source 184 and drain 185 junctions. The diffused areas are represented by stippling in FIGS. 16, 18 and 19. Simultaneously with the diffusion, the polysilicon gates 182 and the contiguous polysilicon runs 186 are heavily doped p-type by the boron, imparting a low resistivity to those areas. The p-doped polysilicon is represented by crosshatching in FIGS. 16, 18 and 19. The p-doped polysilicon runs 186 form, for example, the CL1 and CL2 clock lines as shown on Fig. 16. Where the CL2 line 186 crosses the diffused regions 174, p-channel silicon-gate transistors are formed. The silicon areas 178 within the bounds of the thin-oxide cuts (mask 2) and underlying the polysilicon (mask 3) are also diffused, establishing solid electrical contact between the poly and p-silicon regions.

Refer now to FIGS. 19 and 16. After the diffusion step, a silicon dioxide layer 190 is formed over the entire surface of the structure preferably by vacuum evaporation or by RF sputtering. Mask 4 (see FIG. 14) is then utilized to form openings 192 in the $SiO_2$ layer 190 by photolithographic masking and etching techniques. A layer of aluminum 194 is then evaporated over the entire wafer surface and portions of the layer are etched away using mask 5, see FIG. 15, to produce the desired interconnection patterns (e.g., the CLP lines in the shift register 112, the address programming pads P0–P11, and the runs of the input and output bus portions 100*c,d*). Finally, a sixth mask (not shown) is utilized to apply a passivating layer over the entire surface of the wafer except for the pads which are left uncovered.

ARRAY - CIRCUIT DESCRIPTION

Figure 23:
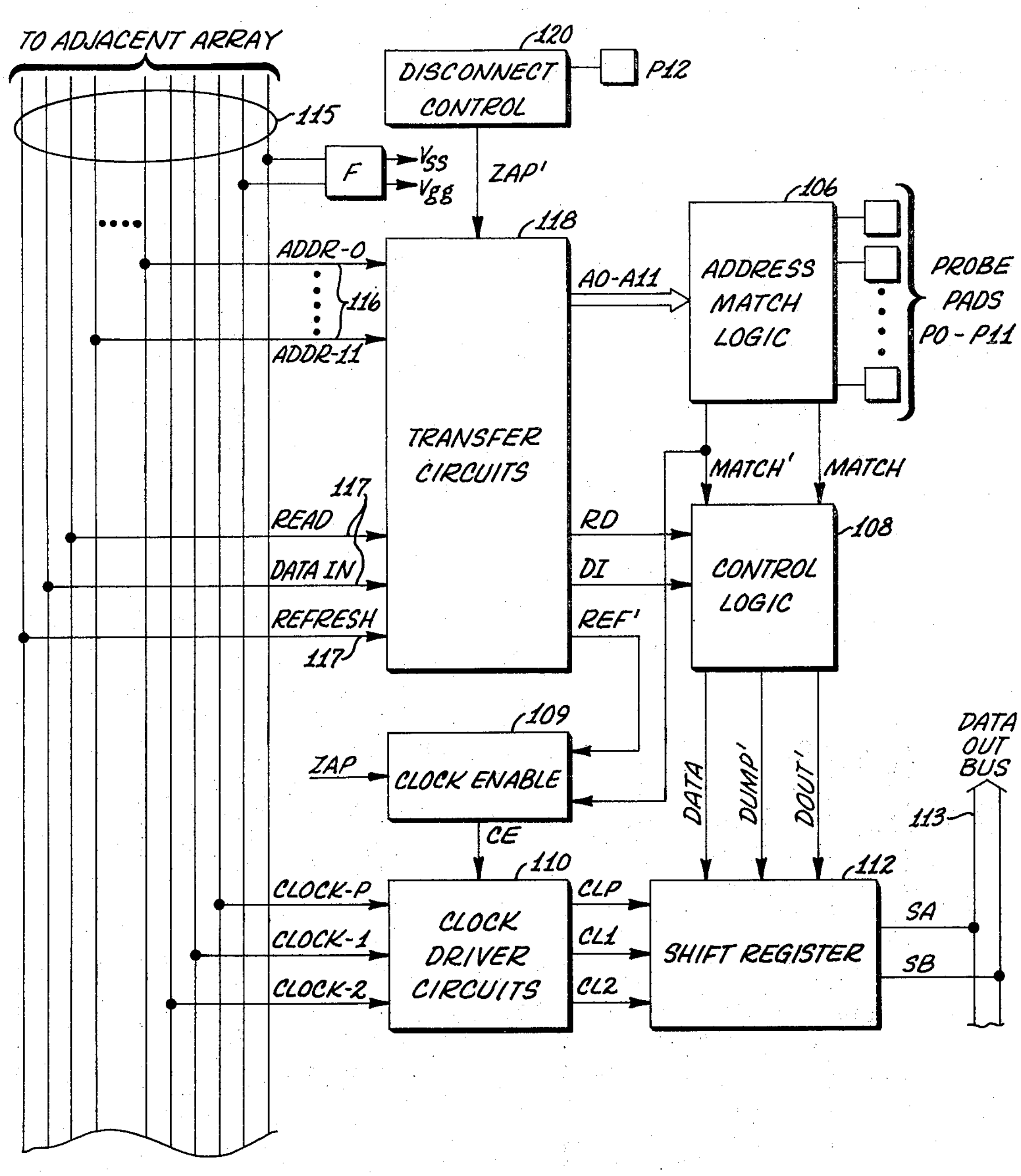
FIG. 23 is a schematic block diagram of an array.

The invention involves the utilization of a large uncut wafer of semiconductor material having many interconnected identical basic circuits completely formed thereon prior to testing. A schematic block diagram of one basic circuit or array is shown in FIG. 23. Each array comprises a two-phase, three-clock, dynamic shift register 112, a bus portion 113, 115 having a plurality of interconnection lines which connect to the lines of an adjacent array by overlapping during the step-and-repeat mask making progress, a set of disconnection devices or transfer circuits 118 at the bus interface, a disconnect control 120 to control disconnection of the array from the bus 115, and address match logic 106 having a PROM for storing an array address and address comparison logic for generating an array enable signal.

Input signals are transferred to each array via the input bus 115. A plurality of diffused runs 116 connect the ADDR0-11 address signals from the input bus 115 to the address match logic 106 via the transfer circuits 118. Other diffused runs 117 connect the READ and DATA IN signals as RD and DI signals to the control logic 108, and the REFRESH signal to a clock enable 109 as an REF′ signal, all via the transfer circuits 118. All arrays are initially (upon fabrication) disconnected from the bus 115, the transfer circuits being disabled by a ZAP signal. During initial wafer testing, operative arrays are connected to the bus 115 by the disconnect control 120. The disconnect control 120 is responsive to a connect voltage applied from an external source such as a multiprobe tester (not shown) to a probe pad P12 to generate and transfer a ZAP′ signal to the transfer circuits 118. The ZAP′ signal enables the transfer circuits 118, allowing transfer of input signals from the bus 115 to the array, thereby connecting the array. Defective arrays are left disabled by the ZAP signal. Supply voltages Vss and Vgg may also be removed from a defective array by means of frangible sectors F of the supply voltage runs or other suitable disconnect devices.

Figure 13:
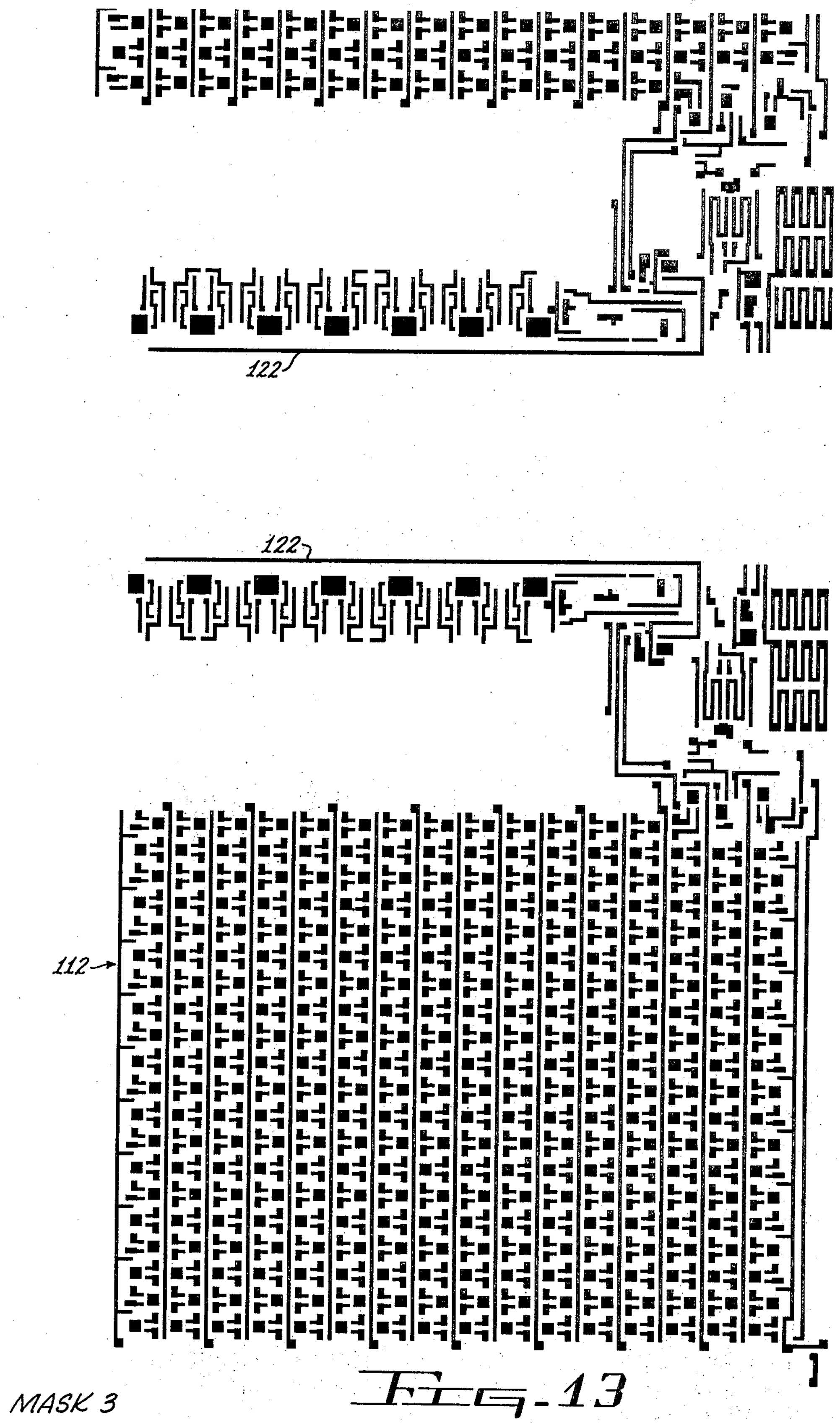
Figure 14:
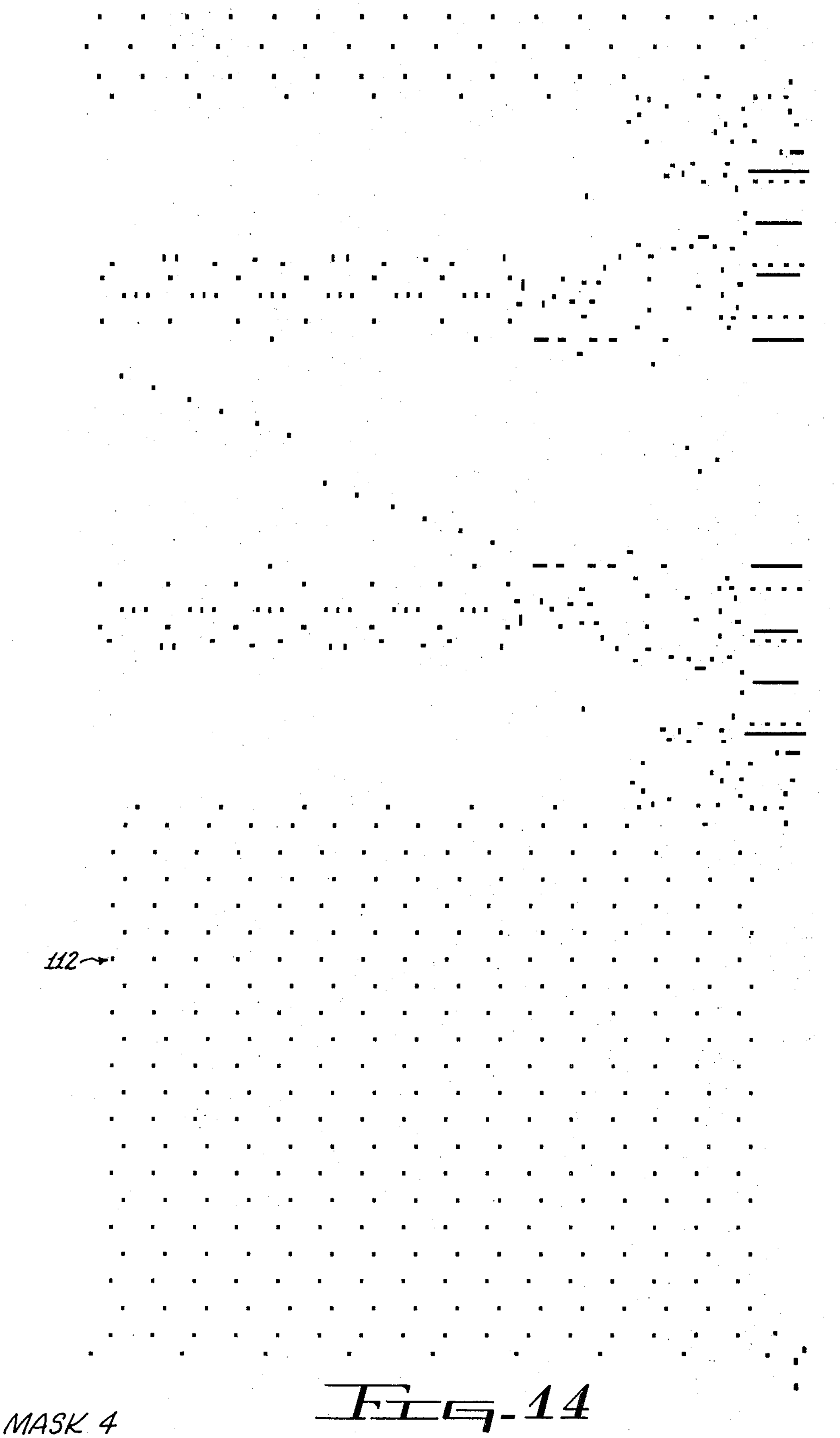
Figure 15:
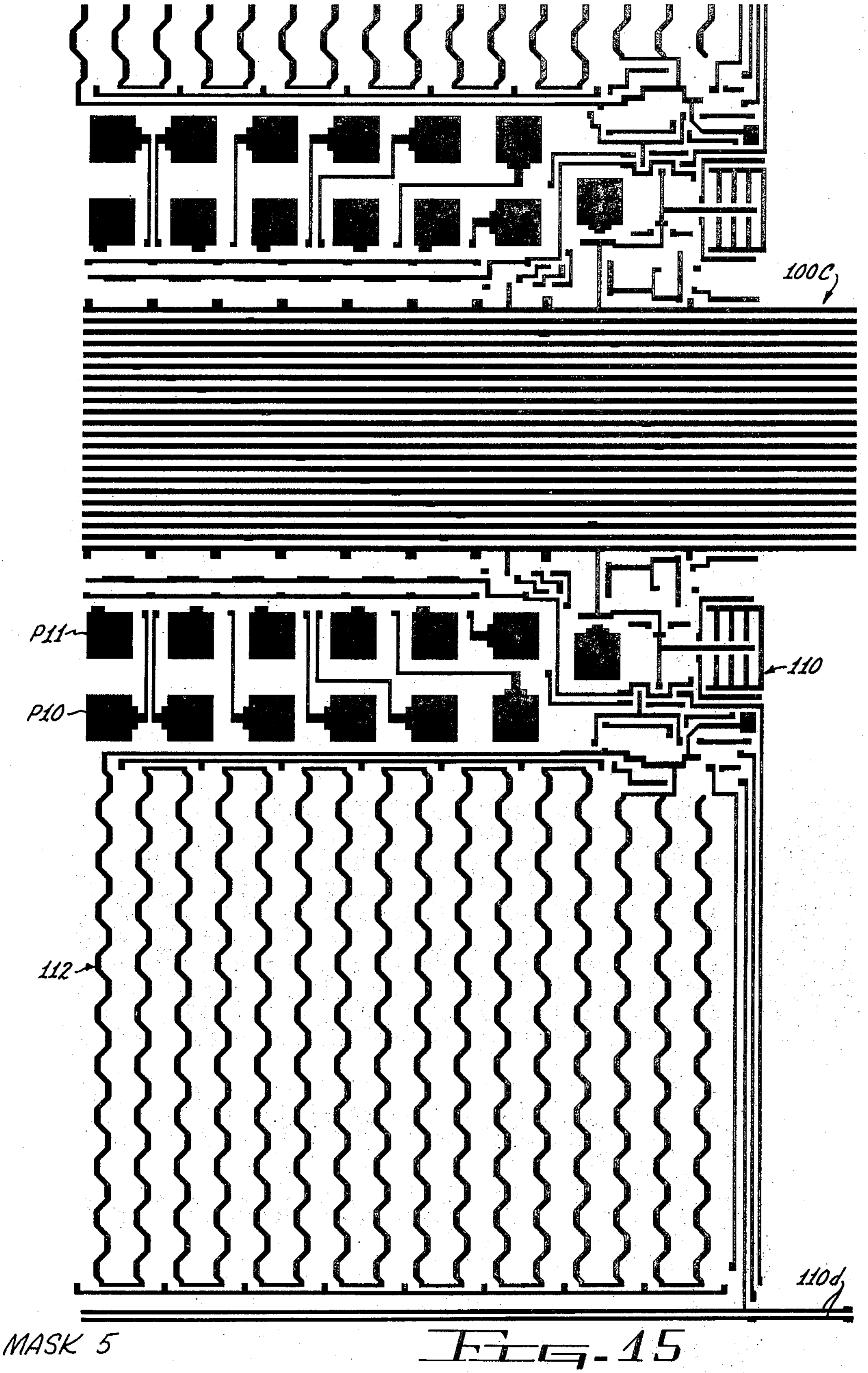

The transfer circuits 118 comprise switching transistors formed as an integral part of the diffused runs 116,117 during wafer manufacture. Referring momentarily to FIGS. 11 and 13, it can be seen that a polysilicon run 122 (FIG. 13) intersects the diffused runs 116,117 (FIG. 11) when masks 3 and 5 are superimposed and aligned. A switching transistor is formed at each of the intersections, the run 122 forming the gates and a carrying gate connector crrrying the ZAP′ signal from the disconnect control 120 (FIG. 23), and the adjacent portions of the runs 116,117 forming the sources and drains of the transistors.

Returning to FIG. 23, stored in the address match logic 106 is a 12-bit absolute binary address with which the incoming address signals A0–A11 are compared. The stored address is placed in the address match logic 106 via the probe pads P0–P11, after wafer manufacture when each array is tested. Addresses in the binary number sequence are assigned to each operative array in an assembly thus rendering each array intrinsically addressable. In subsequent use, during an auxiliary store access, if the A0–A11 signals match the stored address of an array, MATCH and MATCH′ signals are generated by the address match logic 106 and transferred to the control logic 108. The MATCH′ signal is also transferred to the clock enable 109. The clock enable 109 is responsive to the MATCH′ signal and the REF′ signal to generate a CE signal which in turn enables the clock driver circuits 110 to pass the CLOCK-P, CLOCK-1 and CLOCK-2 signals from the input bus 115 to the shift register 112. The control logic 108 is responsive to the MATCH′ signal and the RD signal during a write operation (RD′) to gate data (DI) to the shift register 112 for storage. During a read operation the control logic 108 transfers DUMP′ and DOUT′ signals to the shift register 112. The shift register 112 is responsive to the DUMP′ and DOUT′ signals to transfer the stored contents of the shift register serially to the data out bus 11 as the SA and SB signals, and concurrently to save the stored data by recirculating the data through the shift register. Data is shifted serially through the shift register 112 under control of the CLP, CL1 and CL2 clocks.

The elements of FIG. 23 are shown in detail in the circuit schematics of FIGS. 25–28. Referring first to FIG. 24 (located adjacent FIG. 9), the schematic symbols used herein to depict the circuit elements of the preferred embodiment of my invention are shown. All of the symbols of FIG. 24 represent conductor-insulator-semiconductor (CIS) field effect devices formed, for example, by the silicon-gate process. FIG. 24*a* depicts a general symbol for a transistor 150 represented by a circle. A gate 151 of the transistor 150 is represented by a line bisecting the circle; and source S and drain D elements are represented by lines perpendicular to the gate 151 and emanating from the circle. The symbol is descriptive of an actual device wherein the gate 151 may comprise a portion of a conductive silicon run overlying the channel between the source S and drain D diffusions.

FIG. 24*b* is a symbol representing a specific form of field effect device 158 having a floating gate 159 (i.e., the gate is not connected to any voltage or signal source). The gate 159 is therefore surrounded by an insulator, e.g., silicon dioxide which is a dielectric having very low conductivity. The device is normally off (not conducting, and is turned on by avalanche injection of electrons (p-channel) across the oxide barrier. Avalanche is induced by applying a large voltage (40–50V) for about 1 ms between the drain D (or the most negative terminal) and the substrate. In the logic diagrams of FIGS. 25–28 the substrate connections of the devices are not shown. The substrates are, in fact, connected to a point in the circuit which will ensure that the substrate-channel junction is reverse biased. Thus, with p-channel devices the substrate is connected to the most positive of the supply voltages V*bb* (see Table I). Since the gate 159 is floating, the avalanche injection of electrons results in the accumulation of a negative electron charge on the gate 159. When the applied junction voltage is removed, the charge remains on the gate 159. The negative charge induces a conductive inversion layer in the channel connecting the source S and drain D, turning the device on. Decay of the induced charge due to leakage is negligible during equipment lifetime. The charge may be removed by illuminating the device with ultraviolet light or exposing it to X-ray radiation, thus providing a reprogramming capability.

FIG. 24c is a symbol representing a transistor 154 having a gate 155 and source S and drain D terminals. The FIG. 24c transistor is similar to the FIG. 24a device in most respects except that it is used as a non-linear resistor or load in ratioed circuits in which it has the gate and drain D connected together to a constant potential, $V_{gg}$. The source S is used as the load point. The channel width of the FIG. 24c device is less and the length is considerably greater than that of the input devices, therefore, the FIG. 24c symbol is given a distinctive shape.

The preferred embodiment of my invention was implemented using p-channel CIS devices. The p-channel transistors are preferred because the process exhibits lower susceptibility to contaminants adversely affecting threshold levels, and other well known advantages resulting in lower cost LSIs at the present time. N-channel devices may be used in which case the pulse polarities of the ensuing discussion are reversed. A further convention in the following description assigns a logical 1 to a negative going pulse or a negative level; the assigment is arbitrary.

Figure 25:
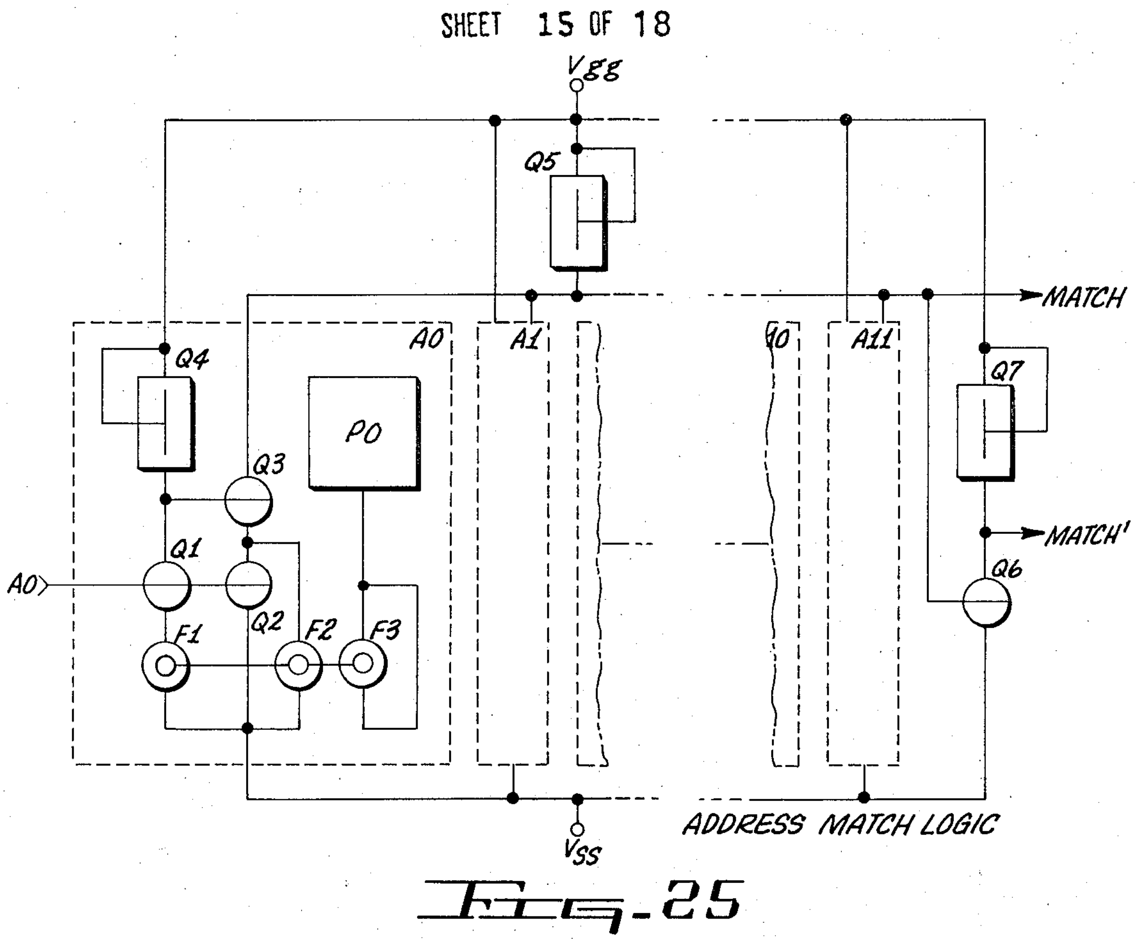
FIGS. 25, 26, 27, and 28 are detailed schematic diagrams of the circuits of FIG. 23.

Referring now to FIG. 25, the circuits of the address match logic (106, FIG. 23) are shown in detail. All three types of devices described above with reference to the symbols of FIG. 24 are used in the address match logic. Transistors F1, F2 and F3 have common floating gates and together form a programmable store for bit-0 (A0) of the 12-bit address of the associated array. A probe pad P0 is connected to a terminal of transistor F3. F3 functions as an isolation device to preclude applying a high voltage to transistors Q2 and Q3. When an avalanche voltage is applied to the pad P0, electrons are injected to the gate of F3 and the charge flows from F3 to the gates of F2 and F1, turning them on, i.e., storing a locial 1. Array addresses may be reprogrammed by first removing the charge from any avalanched floating gate transistor as previously described with reference to FIG. 24b.

Transistors F1 and F2 are integrated into an exclusive OR circuit including transistors Q1, Q2 and Q3 which performs a comparison function between the A0 input and the bit stored in F1, F2. The circuit is static ratioed logic employing transistor Q4 connected as a load device and operates as follows. If Q1 and F1 are turned on by logical 1 inputs, Q3 is held off. If A0 and F1, F2 are logical 0 Q3 is enabled but cannot turn on because both Q2 and F2 are off. If Q3 is off in all twelve of the circuits A0–A11, MATCH is a logical 1. Thus, if the incoming address signals A0–A11 compare exactly with the address bits stored in the floating-gate transistor PROM F1, F2 of each bit position, a MATCH signal is generated in the array. The MATCH signal is inverted in transistor Q6 generating a MATCH' signal. A mismatch of any of the incoming address signals A0–A11 with the corresponding stored address bit of F1, F2 provides a conduction path via Q3, Q2 or Q3, F2, disabling the MATCH signal. The array address match logic is represented by the following equation.

$$MATCH = (A0 \oplus P0)'\ (A1\ \ P1)' \ldots (A11 \oplus P11)'$$

The address match logic circuits are static in order to provide look ahead for the MATCH enable signal prior to application of the clock signals to the dynamic, ratioless circuits of the shift register.

Figure 26:
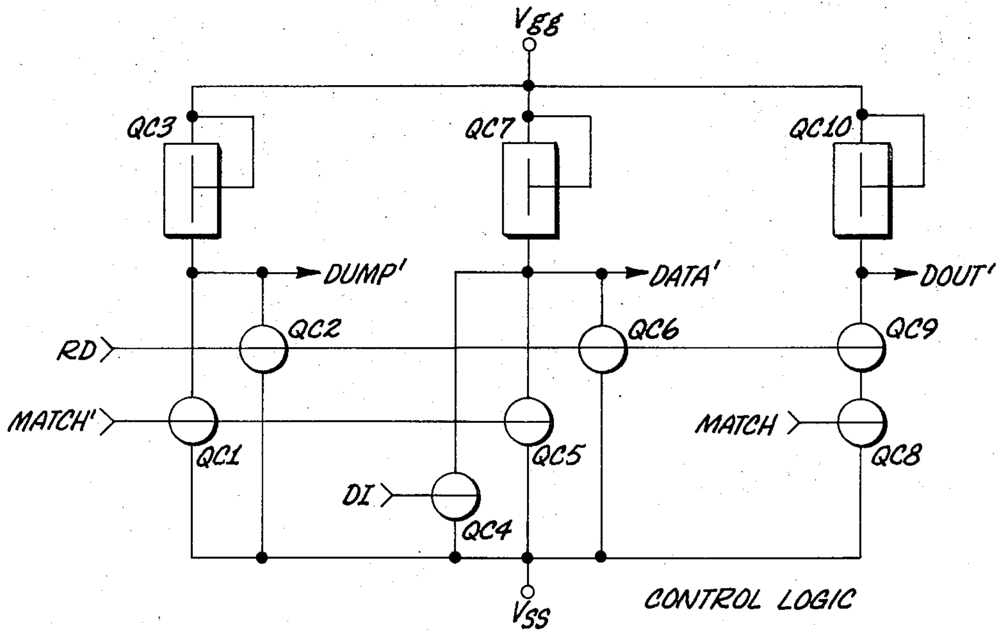

Referring now to FIG. 26, the control logic (108, FIG. 23) is shown in detail. Here also, as in the address match logic (FIG. 25), static ratioed logic is used. Three signals, DUMP', DATA, and DOUT' are generated in the control logic in accordance with the following equations:

DUMP' = MATCH' + RD　　QC1, QC2
DUMP = MATCH RD'
DATA' = RD + MATCH' + DI　　QC4, QC5, QC6
DATA = RD' MATCH DI'
DOUT = MATCH RD　　QC8, QC9
DOUT' = MATCH' + RD'

Thus, during a read operation (RD) in an enabled array (MATCH), the DUMP', DATA' and DOUT signals are enabled. During a valid write operation (RD'), the DOUT' and DUMP signals are enabled and the DATA' signal follows DI. (The input data is inverted, i.e., when the DI signal is logical 0, the DATA' signal is logical 1). The significance of the control logic signals is described later with reference to the shift register and output driver operation.

Figure 27:
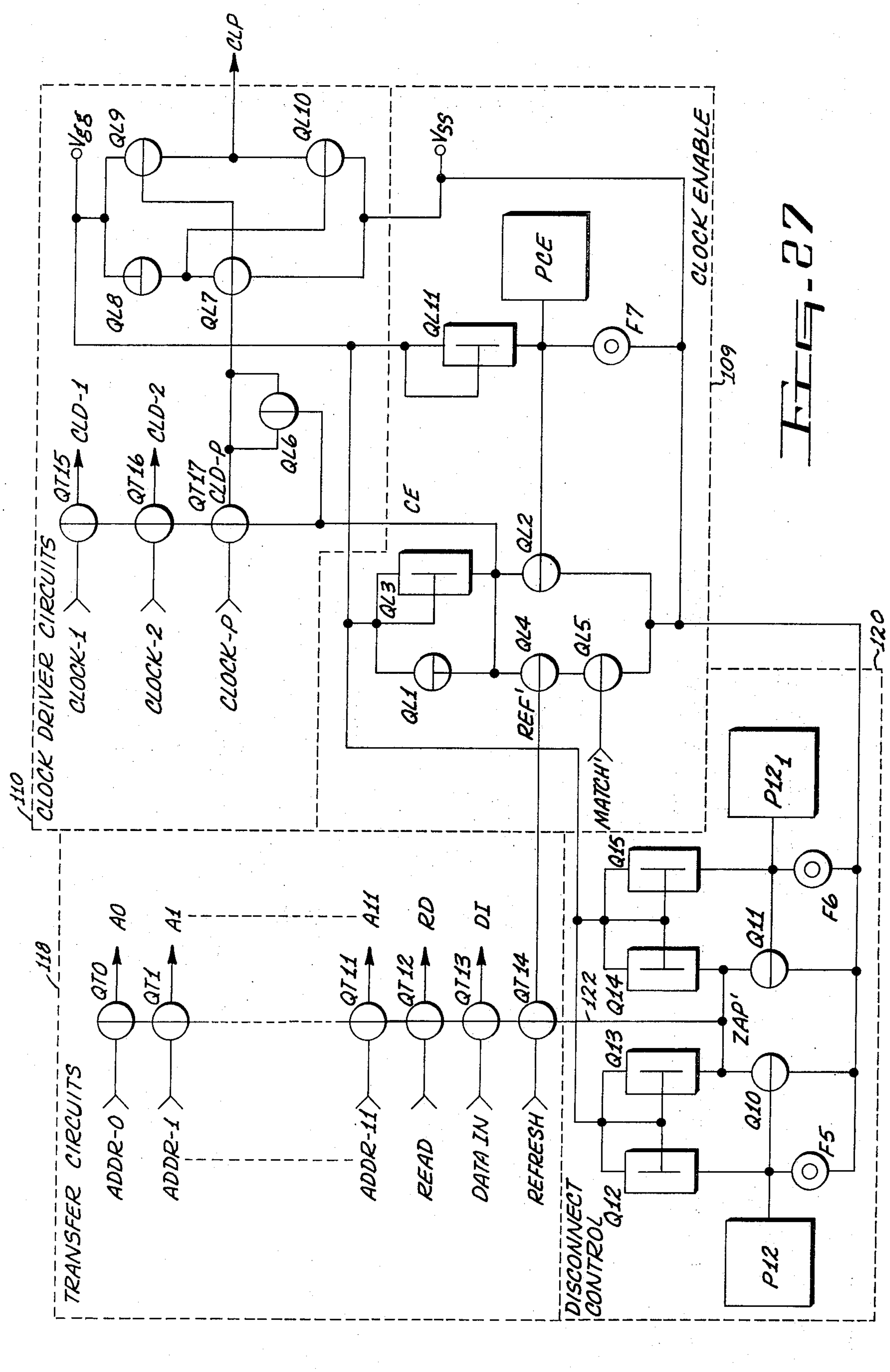

Details of the disconnect control 120 (see FIG. 23) and the transfer circuits 118 are shown on the left-hand side of FIG. 27. A dual disconnect control circuit comprising transistors F5, F6 and Q10–Q15 is shown. Probe pads P12 and $\mathbf{P12_1}$ are connected, respectively, to the drains of floating gate devices F5 and F6. Although a dual disconnect circuit is shown, the operation of only one of the identical circuits is described. F5 is normally off (i.e., no charge on the gate), when the array is tested after wafer manufacture. With F5 off, Vgg potential (less the drop through load device Q12) is applied to the gate of Q10. Q10 conducts enabling a ZAP signal level (logical 0) on the drain of Q10. The Q10 drain is connected to a polysilicon run 122, which forms the gates of switching transistors QT0–QT14. The ZAP signal disables QT0–QT14 preventing the transfer of input signals from the bus to the array through the transfer circuits. During array testing, Vss potential is temporarily applied via probe pad P12 to the gate of Q10 turning Q10 off and applying Vgg potential less the load Q13 drop (ZAP' enable signal) to the gates of QT0–QT14. With the transfer circuits QT0–QT14 enabled the array address match logic (FIG. 25) will respond to an all "zero" (Vss potential) address on the ADDR0–11 address lines, and data (DATA IN, QT13) can be written, read back, and compared to test the array. Upon determining the array good, an avalanche charge is applied to the pad P12, injecting electrons onto the floating gate of transistor F5, turning it on. Q10 is turned off by F5 conducting and a semipermanent ZAP' enable signal level is applied to the gates of transfer transistors QT0–QT14. Concurrently with the enabling of the array as just described, the address match logic (FIG. 25) is programmed by storing the appropriate array address in the floating-gate transistors via the P0–P11 probe pads.

Referring still to FIG. 27, a separate clock-enable disconnect circuit comprising floating gate transistor F7, avalanche pad PCE, and load transistor QL11 is shown. As with the previously described disconnect control circuit, F7 conducting (i.e., electrons injected onto the gate of F7) turns QL2 off, applying a CE clock enable level to the gates of QT15–QT17. The clock-enable disconnect circuit F7, PCE, Q11 is redundant, as is the alternate disconnect control F6, $P12_1$, Q15. Both of the redundant circuits may be eliminated (as in FIG. 23) by deleting the redundant circuit elements and connecting the gate of Q10 (ZAP) directly to the gate of QL2. Thee purpose of the redundant disconnect circuits is to minimize the probability of critical failure whereby the transfer circuits QT0–QT17 cannot be turned off. Transistors Q10 and Q11 control the permanent disconnection of transistors QT0–QT14 (and in addition the disconnection of clock-transfer transistors QT15–QT17 upon elimination of the redundant clock enable disconnect circuit). The transfer transistors QT0–QT17 are rendered inoperative to disconnect the array from the bus only if both Q10 and Q11 fail, e.g., due to a gate-to-substrate short. Correct operation of certain circuits thus is mandatory to prevent a failure in one array from causing failure of an entire group. For example, a bus line (100*c,d*, FIG. 15) shorted to the substrate would render the group defective. The probability of bus shorts is minimized by connecting the bus lines only to diffused regions (116, 117, 111, FIG. 11) of the disconnect transistors QT0–QT17. If there should then be a gate to substrate short in an array transistor, e.g., QL4 of the clock enable circuit or QT17 of the clock driver circuits, a bus short is prevented by turning off the array transfer circuits. If one of the transfer transistors QT0–QT17 fails due to a shorted gate, it will automatically be off and the group remains operative. The only transfer transistor failure mode which can cause bus shorts is a short from gate to source, however, the probability of this failure mode is low because of the minimal gate-to-source/drain overlap area associated with the silicon-gate process.

Still referring to FIG. 27, the transfer transistors QT15-QT17 of the clock driver circuits are enabled by the CE clock-enable signal if the array is good (i.e., PCE true, QL2 off) and both QL4 and QL5 are off.

$$CE = PCE\ (MATCH + REF)$$

$$CE' = PCE' + (MATCH'\ REF')$$

Thus, the CLD-1,2,P clock signals are enabled, respectively, through transfer transistors QT15–17 if an array is good (QL2 off) and the MATCH signal is generated in response to an identity between the incoming address signals A0–A11 and the intrinsic address of the array stored in the floating-gate PROM of the address match logic (FIG. 25). The clocks are generated for a complete array cycle, i.e., a sufficient number of clocks to fill the shift register with new data during a read operation or to read out the entire stored contents during a write operation. Partial cycles could of course be performed, however, data block positioning information must then be maintained by the management control subsystem or by additional logic implemented in the auxiliary store or controller.

During any valid data cycle, read or write, only one array in each assembly is operating at maximum system frequency, all others are ordinarily dormant. The signal levels stored in the capacitive elements of the preferred embodiment of the shift register described hereinafter require periodic refreshing or regeneration to prevent dissipation or leakage of the stored charges. Accordingly, a REFRESH signal is provided which enables the CE signal simultaneously for all arrays in the assembly, on a periodic basis (e.g., every 2 ms in the preferred embodiment). The MATCH' signal (FIG. 25) prevents generation of the DUMP, DATA and DOUT control signals. Data thus is circulated (neither read nor written) in each array. One array in the assembly being refreshed may sense an address match condition, in which case data is read or written normally for that array.

The CLD-1,2,P clock signals are each transferred to a separate clock driver, only one of which (the CLD-P circuit) is shown in FIG. 27. The exemplary clock driver comprises input transistors QL7 and QL9, the latter operating push-pull with QL10. The clock drivers operating in push-pull mode, draw DC power only for the duration of the clock pulse. Standby power (clocks off), therefore, is negligible and due only to leakage current. A transistor QL8 is connected gate-to-drain to provide a non-linear load resistance. The input to QL7 and QL9 is bootstrapped by transistor QL6 connected (source to drain) as a voltage-dependent capacitor to improve the clock signal amplitudes. QL6 charges to approximately Vgg potential (less the threshold drop) through QL3 when no clock pulse is present at the source of QT17. When CLOCK-P is applied to QT17, the stored charge boosts the amplitude of the CLD-P input to QL7. A protective device QL1, connected as a reverse diode provides a discharge path to Vgg. An equivalent circuit for the clock drivers of a typical assembly (e.g., employing the array of FIGS. 11–15) is shown in FIG. 22. To reduce bipolar driver 130 requirements, CIS or MOS drivers 132 in the group overhead areas (see FIGS. 7, 8) are utilized. The overhead area drivers 132 provide a 20:1 reduction in capacitance drive requirements for the bipolar drivers 130. The bus capacitance seen by the drivers 132 is the total of all 64 load capacitances (assuming an 8 × 8 group) and the metal and diffused run capacitances. For example, (referring momentarily to FIG. 8) the bus distribution system comprises 12 micron wide aluminum runs 87 with 12 micron minimum spacing between the runs connecting the contact pads 84 (e.g., driver 130 outputs) the group overhead area 83. The length of these lines is 3mm and there are no crossovers. The connection from the overhead drivers 132 to the array buses 75 (see FIG. 7) are made by 7.5 micron wide runs 76 which are 1 cm long. Diffused runs 111 are 30 microns long and tunnel under the metal 75 into the array where they connect to the array drivers 134. The equivalent lumped circuit delay is approximately 18 ns for the worst case, therefore, the bus system will not degrade the total access time significantly when compared with the speed of the MOS circuits themselves.

Figure 28:
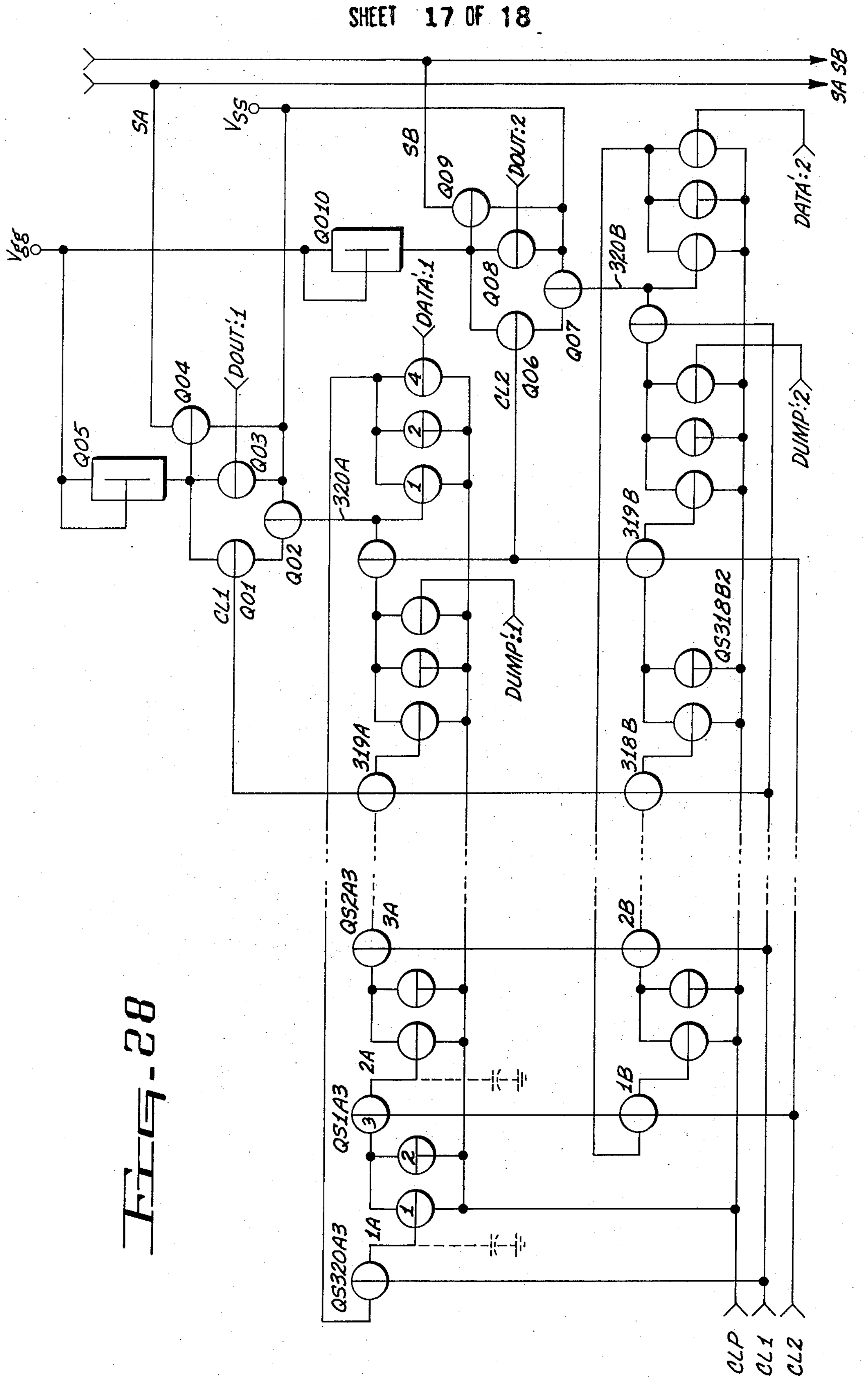

Referring now to FIG. 28, the shift register (112, FIGS. 10 and 23) and the output driver circuits (114, FIG. 10) are shown in detail. The shift register of FIG. 28 employs two-phase, three clock, dynamic ratioless logic in a multiplexed dual-bank 320-bit register, 160 bits of storage per bank. The two banks are evident in the layout of FIG. 28, one bank bearing literal designations of reference A; the other, B. The FIG. 28 schematic diagram is representative of the actual physical layout of the shift register as displayed in FIG. 16 by the data paths DATA A and DATA B. Only representative ones of the shift register transistors are shown and labelled on FIG. 28. For example, transistor QS1A3 (labelled with a small 3 inside the symbol) is to the right of and connected to QS1A2 and QS1A1. Storage nodes consist of the parasitic capacitances of the runs interconnecting the transistors. Two representative storage nodes labelled 1A and 2A are shown as phantom capacitors with dashed lines. One bit of storage requires six transistors in two stages, a storage stage and an inverter stage, as for example, storage stage 1A comprising transistors SQ1A1–QS1A3 and inverter stage 2A comprising transistors QS2A1–QS2A3.

Figure 29:
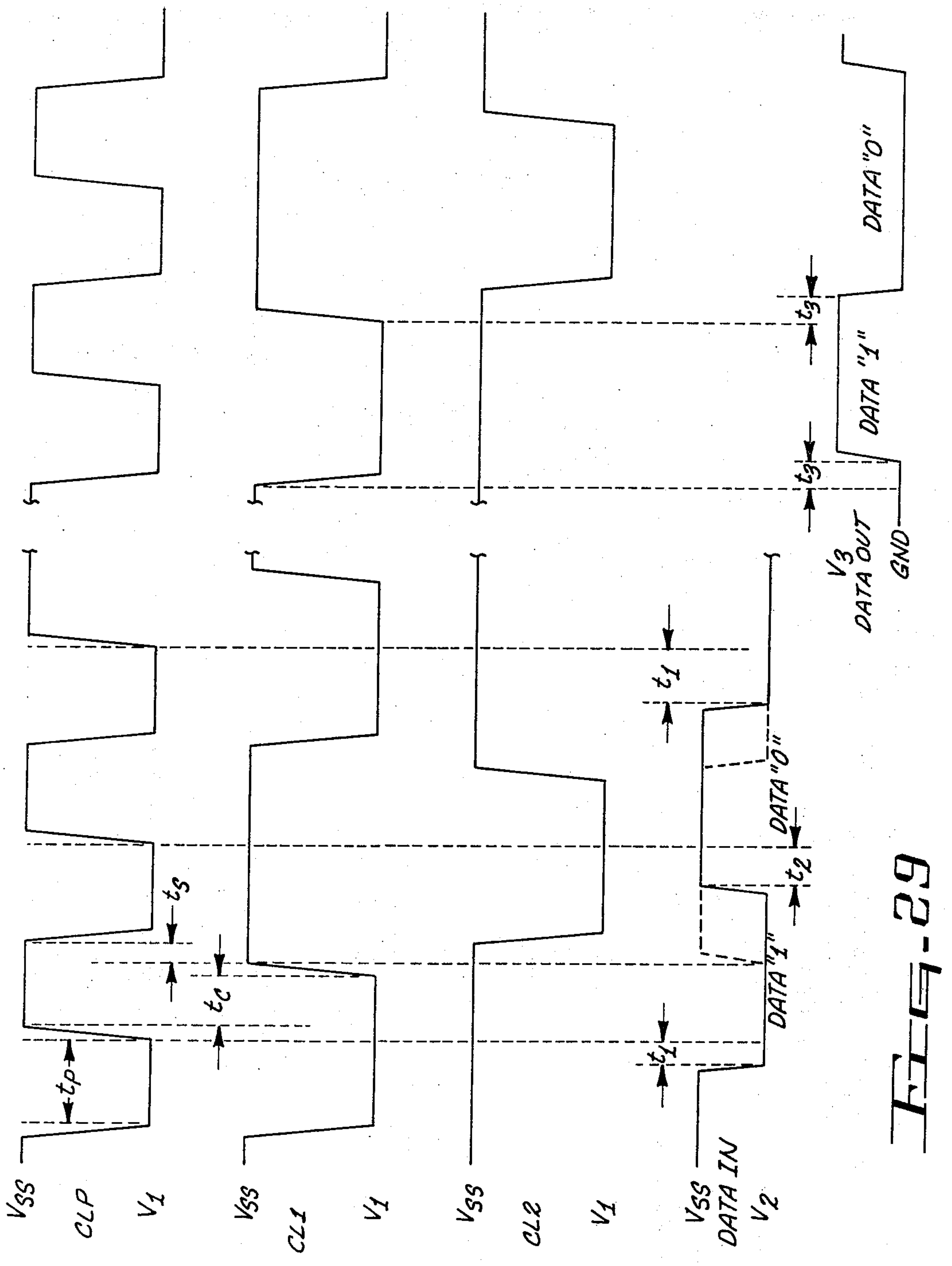
FIG. 29 is a timing diagram depicting the operation of an array.

A timing diagram for the shift register of FIG. 28 is shown in FIG. 29. P-channel devices are utilized in the description of the preferred embodiment; it is understood that n-channel circuits may be used in which case the polarities of FIG. 29 would be reversed and the timing restraints loosened due to the inherently faster speed of n-channel majority carriers.

Referring to FIGS. 28 and 29, the precharge clock CLP and clock CL1 go on (i.e., switch from Vss to $V_1$) at the same time. CLP charges storage node 1A through transist'r QS320A2 (connected gate-to-source to form a precharge diode) and transfer transistor QS320A3. The DATA' signal from the control logic (FIG. 26) is connected to the gates of transistors QS320A4 and QS320B4, respectively, as the DATA':1 and DATA':2 data-in signals. If DATA':1 is a logical 1 (assuming a write operation) transistor QS320A4 turns on and storage node 1A discharges to the CLP bus through QS320A3 and QS320A4, after termination of CLP while CL1 still holds QS320A3 on. Thus, a logical 0 (no charge on storage node 1A) input is applied to the gate of QS1A1 during the subsequent transition of clock CL2. When the CLP and CL2 clocks go on, storage node 2A charges through precharge transistor QS1A2 and transfer transistor QS1A3. Upon termination of the CLP clock, no discharge path is provided for storage node 2A (via QS1A3 and QS1A1) because QS1A1 is held off by the logical 0 input on the gate of QS1A1 (i.e., storage node 1A discharged). Thus, one bit of data traverses one stage of shift register store, from the DATA':1 input line to storage node 2A, during a complete CL1, CL2 transition period.

During the CL2 transition described above, the DATA':2 input signal is transferred to storage node 1B. Concurrently, storage node 1A is not affected because QS320A3 is held off by the absence of CL1. During retrieval of a 320-bit data block, therefore, every other data bit in a string of 320 bits of data traverses bank A of the shift register; the alternate 160 bits, bank B.

Still referring to FIG. 28, the data out drivers comprise transistors Q01–Q010. The data out drivers are dynamic, ratioed logic to avoid drawing excess DC power and reduce the probability of power bus shorts. The DOUT' signal from the control logic (FIG. 25) is applied to transistors Q03 and Q08, respectively, as the DOUT':1 and DOUT':2 signals. During a read operation, the DOUT' signal is a logical 0. Assume that a logical 1 data bit is stored in node 320A at CL1 time. Q01 and Q02 are turned on at CL1 time and Q03 is held off by the DOUT' signal. Consequently, the output of Q04 reflects the state of storage node 320A (inverted), and the Q04 output is transferred to the data out bus line SA. Simultaneously, the data bit of node 320A is transferred to storage node 1A, recirculating the data read out. For the example described, the logical 1 of storage node 320A turns on QS320A1, providing a conditional discharge path to the CLP bus for node 1A through QS320A3 and QS320A1. QS320A4 is held off by the DATA':1 signal (RD = DATA'). During the subsequent transition of CL2, the data bit at node 320B is similarly transferred to data out bus line SB, and recirculated to node 1B. During a write operation (RD') the data out drivers are disabled by the DOUT signal turning Q03 and Q08 on, which in turn disables Q04 and Q09. A technique commonly used in core-memory technology is employed for sensing the output data in the embodiment described. The data-out bus comprising a pair of balanced lines SA and SB is terminated with approximately 500 Ω resistance to ground, and a current-sensing differential amplifier (not shown) is employed to sense the data. Random noise coupled generally to both lines is thus reduced by common mode noise rejection. Alternatively, data A and data B may be multiplexed through a single output transistor and applied to only one of bus lines, the other line acting as the return conductor of the transmission line pair.

During a write operation, previously described, new data is entered into the shift register nodes 1A and 1B via transistors QS320A4 and QS320B4. Data shifted through the register, i.e., the old data previously stored, is discharged by applying the DUMP signal from the control logic (FIG. 25) to the gates of transistors QS319A4 and QS319B4. The DUMP signal enables QS319A4 and QS319B4, providing discharge paths to the CLP bus, respectively, for nodes 320A and 320B upon termination of the CLP clock. Old data traversing the shift register is thus discarded by forcing a logical 0 into the storage nodes of the stages where new data enters.

FIG. 29 displays representative data-in and data-out signals in relation to the CL1, CL2 and CLP clock signals. Nominal operating voltages for the embodiment described are listed in Table I below. Typical timing relationships are also shown and their values listed in Table II. The most important times are the precharge time tp and the conditional discharge time tc both of which times directly affect the final storage node voltages. The separation time ts must be sufficient to allow stabilization of the clock driver circuits and to make certain that the storage nodes of the shift register are not exposed to a charging voltage before the transfer transistors QSXX3 are completely turned off by removal of the preceding clock pulse.

| TABLE I | | TABLE II | |
|---|---|---|---|
| Vbb | 5v | $tp$ | >150ns |
| Vgg | −12v | $tc$ | >80ns |
| Vss | 4v | $ts$ | >20ns |
| $V_1$ | −12v | $t_1$ | >50ns |
| $V_2$ | −6v | $t_2$ | >100ns |
| $V_3$ | 0.6v | $t_3$ | 50ns |

A logical 1 data signal (DATA 1) must be valid, i.e., $V_2$ potential, for a period $t_1$ prior to the termination of the precharge clock CLP to allow sufficient time for charging the storage nodes. The DATA 1 signal may terminate when the associated CL1 or CL2 clock signal (in the instant description, CL1) terminates as indicated by the dashed line signal transition to Vss. A positive-going transition to a logical 0 data signal (DATA 0) must occur prior to the termination of CLP by a period $t_2$ to provide a longer time for input circuit stabilization. The DATA 0 level may terminate concurrently with the corresponding phased clock (CL2) as shown by the dashed line transition to $V_2$ potential. All address and control signal input lines are stabilized approximately 500ns before CLP and CL1 are first applied to an array, and are held stable until the trailing edge of the final CL2 clock pulse. All input signals (except the clock pulses) swing from Vss to $V_2$.

Data out signals varying between $V_3$ and ground are shown after a 320-bit delay when terminated in 500 Ω to ground. Delay $t_3$ is a function of the output inverter circuits and the current available to charge the data out bus SA, SB.

It will be apparent to those skilled in the art that the disclosed semiconductor mass store may be modified in numerous ways and may assume many embodiments other than the preferred form specifically set out and described above. For example, the shift register may be implemented with charge-transfer dynamic devices thereby greatly reducing the array size and increasing circuit speed. The preferred devices utilized for disconnect control and address programming are electrically reprogrammable elements. Other forms of programmable elements such as fusible link devices may be utilized. Finally, other types of electrically reprogrammable elements such as metal alumina oxide semiconductor (MAOS) and MNOS devices may be used as well. Accordingly, it is intended by the appended claims to cover all modifications of the invention which fall within the true spirit and scope of the invention.

What is claimed is:

1. An integrated-circuit store having connected thereto from an external source a plurality of address signal leads and a data signal lead and adapted to receive address signals from said external source and to transfer data signals to and from said external source, said store comprising a body of semiconductor material, a plurality of basic circuits formed on said body of semiconductor material as a common substrate, and means for connecting said signal leads to at least one of said plurality of basic circuits, each one of said basic circuits comprising:

a bus portion includig a plurality of address signal lines and a data signal line, said bus portion abutting a like adjacent bus portion to form therewith a signal bus interconnecting said plurality of basic circuits;

a first means for storing said data signals;

a second means for storing a predetermined unique address;

means responsive to a comparison between said address signals and said predetermined unique address for generating an enable signal;

second means for connecting said address signal lines to said generating means and said data signal line to said first storage means;

means responsive to said enable signal for controlling the transfer of said data signals between said data signal line and said first storage means; and means for disabling said second connecting means, thereby disconnecting said one basic circuit from said signal bus.

2. An integrated-circuit store according to claim 1 wherein said first storage means comprises a semipermanent voltage-programmable read-only store.

3. An integrated-circuit store according to claim 1 wherein said disabling means comprises a semipermanent voltage-programmable transister.

4. An integrated-circuit store having applied thereto from a controller a plurality of address signals and connected to an external data line and adapted to transfer data signals to and from said external data line, said store comprising a body of semiconductor material, a plurality of basic circuits formed on said body of semiconductor material as a common substrate, and a first means for connecting said data line and said applied signals to at least one of said plurality of basic circuits, each one of said basic circuits comprising:

a bus portion including a plurality of address signal lines and a data signal line, said bus portion abutting a like adjacent bus portion to form therewith a signal bus interconnecting said plurality of basic circuits;

switching means;

a first means for storing a predetermined address;

a second means for storing said data signals;

means connected to said second storage means for controlling the transfer of said data signals between said second storage means and said data signal line;

means for comparing said address signals with the contents of said first storage means, said comparing means responsive to a coincidence between said address signals and said predetermined address to generate an enable signal;

a second means for connecting via said switching means said address signals to said comparing means and said data signal line to said second storage means;

said control means responsive to said enable signal to control the transfer of said data between said data signal line and said second storage means; and a means for disabling said switching means, thereby disconnecting said one basic circuit from said signal bus.

5. An integrated-circuit store having applied thereto from a controller a plurality of address signals, a clock signal, and a read/write signal and connected to an external data line and adapted to transfer data signals to and from said external data line, said store comprising a body of semiconductor material, a plurality of basic circuits formed on said body of semiconductor material as a common substrate, and a first means for connecting said external data line and said applied signals to at least one of said plurality of basic circuits, each one of said basic circuits comprising:

a bus portion including a plurality of address signal lines, a read/write signal line, a clock signal line, and a data signal line, said bus portion abutting a like adjacent bus portion to form therewith a signal bus interconnecting said plurality of basic circuits;

switching means;

a first means for storing a predetermined address;

a second means for storing a series of said data signals;

a means connected to said second storage means for controlling the transfer of said data signals between said second storage means and said data signal line;

a means connected to said second storage means for timing the movement of said series of data signals through said second storage means;

means for comparing said address signals with the contents of said first storage means, said comparing means responsive to a coincidence between said address signals and said predetermined address to generate an enable signal;

a second means for connecting via said switching means said address signals to said comparing means, said clock signal to said timing means, and said read/write signal and said data signals to said control means;

said timing means responsive to said enable signal to transfer said clock signal to said second storage means;

said control means responsive to said enable signal and said read/write signal to enable the transfer of said data signals between said data signal line and said second storage means; and meano for disabling said switching means thereby disconnecting said one basic circuit from said signal bus.

6. An integrated-circuit store as claimed in claim 5 wherein said first storage means comprises a reprogrammable, charge-store transistor.

7. An integrated-circuit store as claimed in claim 5 wherein said second storage means comprises a dynamic, ratioless-logic shift register.

8. A block-addressable integrated-circuit memory having applied thereto from an external signal source a plurality of address signals, a read/write signal, an input data signal, and a clock signal and connected to an output data signal lead, said memory comprising a wafer of semiconductor material, a group of arrays formed on said wafer as a common substrate, and a group bus connecting said plurality of address signals, said read/write signal, said input data signal, said clock signal and said output data signal lead to at least one of said group of arrays, each of said arrays comprising:

a bus portion including a plurality of address signal lines, a read/write signal line, a clock signal line, an input data signal line, and an output data signal line, the bus portion aligned with and abutting an adjacent bus portion to form therewith an input-output signal bus interconnecting said group of arrays, the lines of at least one of said bus portions receiving corresponding ones of said applied signals;

an address match logic including a voltage-programmable store having a preselected array address stored therein;

a shift register storing a series of said data signals therein and having an output driver connected to said output data signal line;

a clock driver connected to said shift register and to said address match logic;

a control logic connected to said address match logic, and to said shift register;

a plurality of transfer circuits;

a plurality of runs connecting via said transfer circuits the address signal lines to the address match logic, the clock signal line to the clock driver, the read/write signal line to the control logic, and the input data signal line to the control logic;

said address match logic responsive to a coincidence between said externally applied address signals and said preselected array address to generate a match signal;

said control logic responsive to said match signal and said read/write signal to control the transfer of said input data to said shift register;

said clock driver responsive to said match signal to regenerate and transfer said externally applied clock signal to said shift register;

said shift register responsive to said control logic and said clock signal to store said input data signals during a read operation and to transfer said stored data signals to said output data signal line during a write operation; and a disconnect control disabling said transfer circuits upon determining said one array defective.

* * * * *